(12) United States Patent
Mosca et al.

(10) Patent No.: US 10,885,458 B2
(45) Date of Patent: Jan. 5, 2021

(54) QUANTUM CIRCUIT SYNTHESIS USING DETERMINISTIC WALKS

(71) Applicant: Michele Mosca, Kitchener (CA)

(72) Inventors: Michele Mosca, Kitchener (CA); Olivia Nicole Di Matteo, Waterloo (CA)

(73) Assignee: Michele Mosca, Waterloo (CA)

( * ) Notice: Subject to any disclaimer, the term of this patent is extended or adjusted under 35 U.S.C. 154(b) by 344 days.

(21) Appl. No.: 15/556,375

(22) PCT Filed: Mar. 9, 2016

(86) PCT No.: PCT/CA2016/050257
§ 371 (c)(1),
(2) Date: Sep. 7, 2017

(87) PCT Pub. No.: WO2016/141481
PCT Pub. Date: Sep. 15, 2016

(65) Prior Publication Data
US 2018/0039903 A1 Feb. 8, 2018

Related U.S. Application Data

(60) Provisional application No. 62/130,042, filed on Mar. 9, 2015.

(51) Int. Cl.
*G06F 30/30* (2020.01)
*G06N 10/00* (2019.01)
*B82Y 10/00* (2011.01)

(52) U.S. Cl.
CPC .............. *G06N 10/00* (2019.01); *B82Y 10/00* (2013.01)

(58) Field of Classification Search
CPC .... C12Q 2537/165; C12Q 1/00; C07K 17/08; C07K 1/047; B01J 2219/00657;
(Continued)

(56) References Cited

U.S. PATENT DOCUMENTS 7,398,507 B2 7/2008 Chang et al.
7,788,192 B2 8/2010 Amin
(Continued)

FOREIGN PATENT DOCUMENTS

WO 2015157049 A2 10/2015

OTHER PUBLICATIONS

Amy et al. "A Meet-in-the-Middle Algorithm for Fast Synthesis of Depth-Optimal Quantum Circuits" Jun. 2013, IEEE, vol. 32, pp. 818-830. (Year: 2013).*
(Continued)

*Primary Examiner* — Binh C Tat
(74) *Attorney, Agent, or Firm* — CPST Intellectual Property Inc.; Brett J. Slaney

(57) ABSTRACT

There is provided a method for implementing an algorithm for forming, or synthesizing, quantum circuits on a system capable of performing the quantum circuit synthesis by using a deterministic walk (i.e. a pseudo-random walk with a random or pseudo-random starting point). In one implementation, the deterministic walk is performed using a parallel search algorithm. In an implementation of the parallel search algorithm, a user utilizes a programming language to write instructions for a compiler. Then, a meet in the middle approach is utilized to separate the circuit into two halves. Next, the parallel search technique is used to find a claw, or a pair, which satisfies the circuit analysis. Subsequently there is the production of a result and/or a synthesis of the circuit if the pair is found.

19 Claims, 5 Drawing Sheets

(58) Field of Classification Search
CPC .... B01J 2219/00659; B01J 2219/00664; B01J 2219/00828; A61B 2562/046; A61B 2562/066; A61B 2562/12; G06F 2203/011; G06F 3/011; G06F 40/35; G06F 1/06; H01S 5/4025
USPC .................................................. 716/100–108
See application file for complete search history.

(56) References Cited

U.S. PATENT DOCUMENTS

| | | | | |
|---|---|---|---|---|
| 7,895,560 | B2* | 2/2011 | Lovell | G06F 15/76 708/130 |
| 2004/0024750 | A1 | 2/2004 | Ulyanov et al. | |
| 2004/0128081 | A1* | 7/2004 | Rabitz | G01N 21/636 702/23 |
| 2006/0123363 | A1 | 6/2006 | Williams et al. | |
| 2008/0140749 | A1 | 6/2008 | Amato et al. | |
| 2009/0006061 | A1* | 1/2009 | Thukral | G16H 10/20 703/11 |
| 2009/0112564 | A1* | 4/2009 | Schmieder | G06F 30/3323 703/21 |
| 2011/0145288 | A1 | 6/2011 | Hall | |
| 2013/0011069 | A1* | 1/2013 | Quan | G06K 9/00704 382/190 |
| 2014/0026107 | A1 | 1/2014 | Bocharov et al. | |
| 2014/0280427 | A1 | 9/2014 | Bocharov et al. | |
| 2015/0106418 | A1 | 4/2015 | Kliuchnikov et al. | |
| 2016/0328253 | A1* | 11/2016 | Majumdar | G06N 3/126 |

OTHER PUBLICATIONS

Amy et al. "A Meet-in-the-Middle Algorithm for Fast Synthesis of Depth-Optimal Quantum Circuits" Jun. 2013, IEEE, vol. 32, pp. 818-830. (Year: 2013) (Year: 2013).*

Amy et al., "A Meet-In-The-Middle Algorithm for Fast Synthesis of Depth-Optimal Quantum Circuits", IEEE Transactions on Computer-Aided Design of Integrated Circuits and Systems, vol. 32, No. 6, Jun. 2013, pp. 818-830.

Amy et al., "Polynomial-Time T-Depth Optimization of Cl ifford+T Circuits via Matroid Partitioning", IEEE Transactions on Computer-Aided Design of Integrated Circuits Systems, vol. 33, No. 10, Oct. 2014, pp. 1476-1489.

Giles, B. and Selinger, P.; Exact synthesis of multiqubit Clifford+T circuits; Phys. Rev. A 87, 032332 (2013).

Gosset, D., Kliuchnikov, V., Mosca, M.; Russo, V.; An algorithm for the T-count; Quantum Information & Computation; vol. 14, Issue 15-16, Nov. 2014, pp. 1261-1276.

International Search Report issued in corresponding PCT Application No. PCT/CA2016/050257; search completed on Jun. 13, 2016.

Kliuchnikov, V. , Maslov, D., Mosca,M.; Fast and efficient exact synthesis of single qubit unitaries generated by Cliford and T gates; Quantum Information and Computation, vol. 13, No. 7,8 pp. 607-630 (2013).

Maslov et al., "Quantum Circuit Simplification and Level Compaction", IEEE Transactions on Computer-Aided Design of Integrated Circuits and Systems, vol. 3, Mar. 2008, pp. 436-444.

Miscellaneous Google™ search results—re: search techniques: "Week 12—Complexity Searching", University of Toronto, Department of Computer Science, CSC 108H—Notes, Fall 2000; "Linear search", Wikipedia; "Random search", Wikipedia; "Pattern search (optimization)", Wikipedia; and "Binary search algorithm", Wikipedia, downloaded on Jun. 17, 2016.

Travaglione, "Designing and Implementing Small Quantum Circuits and Algorithms", DAC 2003, Jun. 2-6, 2003, Anaheim, California, USA, pp. 894-899.

Van Oorschot, P. C. and Wiener, M. J.; Parallel Collision Search with Cryptanalytic Applications; Journal of Cryptology. Jan. 1999 , vol. 12, Issue 1, pp. 1-28 (for everything parallel-collision finding).

* cited by examiner

QUANTUM CIRCUIT SYNTHESIS USING DETERMINISTIC WALKS

CROSS-REFERENCE TO RELATED APPLICATIONS

This application is a national phase entry of PCT Application No. PCT/CA2016/050257 filed on Mar. 9, 2016, which claims priority to U.S. Provisional Patent Application No. 62/130,042 filed on Mar. 9, 2015, the contents of which are incorporated herein by reference in their entirety.

TECHNICAL FIELD

The following relates generally to quantum computing, and particularly to synthesizing quantum circuits using a deterministic walk.

BACKGROUND

Traditional computers are built on the architecture of the binary number format. They feature bits which have two states; these states can be referred to as "off" or "on", or as "0" or "1" respectively. These conventional bits are retained in electronic components such as transistors. CPUs typically have a small, fixed set of instructions for operating directly on these bits in the memory; these operations are known as machine code and are operations in the form of Boolean logic used to conduct computations. The basic operations used in performing these computations can be referred to as "gates". Any operation performed on a computer can be understood to be some combination of these basic operations. However, programming in machine language directly is considered very cumbersome and prone to errors. Therefore, a programmer writes instructions to a computer by utilizing various human readable programming languages such as C++, Java, etc. It is then the task of a compiler to (among other things) translate the said programming languages into said machine code.

As stated previously, the most common electronic component for storing the states of bits is a transistor, many of these transistors are combined together to form chips. In order to speed up or increase the capability of traditional computers, the most common method is to increase the amount of transistors on a chip. This is accomplished by using both smaller transistors, and by placing them closer together. "Moore's law" is an observation which states that, over the history of computing hardware, the number of transistors in a dense integrated circuit doubles approximately every two years. This observation has held relatively true as evidenced by the ever increasing capabilities of traditional computers, having more and more transistors.

However, there is a physical limit to how close two transistors can be placed on a chip. Eventually, the predictions of Moore's law will be unattainable, yet the complexity of computational problems being solved by computers is only increasing.

A new architecture for computing, which is under development, is referred to as Quantum Computing. Quantum computing utilizes quantum mechanics to carry out computational processes. Quantum computers utilize the principle of superposition in quantum elements, such as the property of "spin" in quantum elements such as electrons. Superposition is the ability of elements at the quantum level to have more than one state simultaneously, while "spin" is a particle's ability to possess a magnetic dipole moment. As the "spin" is able to interact with magnetic forces, when placed in a magnetic field the spin of an electron aligns with the magnetic field in a manner analogous to a needle in a compass interacting with the earth's magnetic field. Thus, an electron can be said to have two states, one which aligns with a magnetic field it is placed in (analogous to "off" or "0" in traditional bits) and another where it opposes the direction of the magnetic field it is placed in (analogous to on or 1 in traditional bits).

Therefore, these quantum elements can be used as "bits" in quantum computing. Instead of using traditional bits, a quantum computer operates using quantum mechanical bits (qubits). When combined with superposition, it is found that an element can be in a state comprised of a combination of both basis states until it is measured.

The basis states of a qubit are referred to as the $|0\rangle$ basis state and the $|1\rangle$ basis state. During quantum computation, the state of a qubit is defined as a superposition of the $|0\rangle$ basis state and the $|1\rangle$ basis state. This means that the state of the qubit simultaneously has a nonzero probability of occupying the $|0\rangle$ basis state and a nonzero probability of occupying the $|2\rangle$ basis state. The ability of a qubit to have a nonzero probability of occupying a first basis state ($|0\rangle$) and a nonzero probability of occupying a second basis state ($|1\rangle$) provides the quantum computing capability.

The superposition of the multiple states of a qubit is generally defined by a wave function. Mathematically, a superposition of basis states means that the overall state of the qubit, which is denoted $|\psi\rangle$, has the form:

$$|\psi\rangle = \alpha|0\rangle + \beta|1\rangle$$

where $\alpha$ and $\beta$ are probability amplitudes. The terms $\alpha$ and $\beta$ each have real and imaginary components. Typically, when the state of a qubit is measured (e.g., read), the superposition of basis states collapses to either the $|0\rangle$ basis state or the $|1\rangle$ basis state, thus regaining its similarity to a conventional bit. The actual state of the qubit after it has collapsed depends on the probability amplitudes $\alpha$ and $\beta$ immediately prior to the readout operation.

Due to the properties of wave functions and quantum mechanics, the processing of each state in the superposition of states of qubits is done simultaneously. A conventional N-bit computer is capable of performing one N-bit computation on a single N-bit input at a time, but an N-qubit quantum computer can perform an N-bit computation on all $2^N$ N-bit inputs at the same time due to the superposition of states, sometimes called, the quantum parallelism phenomenon. The only known general-purpose way for a conventional computer to simulate a quantum computer performing a computation on N qubits involves performing the computation separately on all $2^N$ N-bit inputs. Thus, for some computational problems, quantum computers are believed to be exponentially more efficient.

Quantum computing also utilizes the principle of quantum entanglement. Quantum entanglement is a physical phenomenon that occurs when pairs or groups of particles are generated or interact in ways such that the quantum state of each particle cannot be described independently and instead must be described as a whole.

One difficulty in building a quantum computer is that the qubits, in their quantum superposition of states, are in an extremely delicate and sensitive phase coherent balance. Any outside disturbance at all (e.g., simply observing the qubit), can detrimentally alter the wave function, for example causing it to "decohere" or "collapse" to just one of its possible states, in which case, the other states, along with the information they represent, will be lost. Thus, the qubits must be isolated in order to preserve their quantum phase coherence. However, the qubits also need to be loaded with initial input conditions, controlled to perform specified functions, and then read to produce a result.

Quantum computing generally involves initializing the states of N qubits, allowing these states to evolve according to some prescribed transformations, and reading out the qubits after the states have evolved. This initial state undergoes an evolution, governed by the interactions that the qubits have among themselves and with external influences. This evolution of the states of N qubits defines a calculation. Reading out the states of the qubits after evolution is complete determines the results of the calculations.

In order to provide for interactions among the qubits, it is important for a quantum computing system to make use of quantum gates (similar to logic gates in classical or conventional computing) so that the state of each qubit in the system can evolve in a controlled manner. A quantum gate (or quantum logic gate) is a basic quantum circuit operating on one or more qubits. Quantum gates are the building blocks of quantum circuits, similar to the way classical logic gates are used to build conventional digital circuits.

Quantum logic gates are generally represented by unitary matrices. A gate which acts on k qubits is represented by a $2^k \times 2^k$ unitary matrix. The number of qubits in the input and output of the gate are equal. The action of the quantum gate is found by multiplying the matrix representing the gate with the vector which represents the quantum state.

In working with quantum gates (as with classical gates) it is useful to find a set of universal quantum gates. A set of universal quantum gates is generally defined as any set of gates to which any operation possible on a quantum computer can be reduced, that is, any other unitary operation can be expressed (to arbitrary precision) as a finite sequence of gates from the set.

There are various types of quantum gates, many of which are related to their classical counterparts. For example, the Clifford group of quantum operators includes the quantum operations (or gates):

Controlled-Z,

Hadamard $H = \frac{1}{\sqrt{2}} \begin{bmatrix} 1 & 1 \\ 1 & -1 \end{bmatrix}$, and Phase( = |0⟩⟨0|+i|1⟩⟨1|).

Another typical gate is the single-qubit T gate:

$T = \begin{pmatrix} 1 & 0 \\ 0 & e^{i\frac{\pi}{4}} \end{pmatrix}$

Some examples of more complex gates include the Toffoli and Fredkin gates.

The Toffoli gate, also called the CCNOT gate, is a 3-bit gate. In classical computation, the Toffoli gate is universal. The quantum Toffoli gate is the same gate, defined for 3 qubits. If the first two bits are in the state |1⟩, it applies an operation known as a Pauli-X on the third bit, else it does nothing. It is an example of a controlled gate. Its matrix form is:

$$\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 0 & 1 \\ 0 & 0 & 0 & 0 & 0 & 0 & 1 & 0 \end{bmatrix}$$

It can be also described as the gate which maps |a, b, c⟩ to |a, b, c, ⊕ ab⟩.

The Fredkin gate (also called the CSWAP gate) is a 3-bit gate that performs a controlled swap. It is universal for classical computation. It has the useful property that the numbers of 0s and 1s are conserved throughout. Its matrix form is:

$$\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 0 & 0 & 0 & 0 & 1 & 0 & 0 \\ 0 & 0 & 0 & 0 & 0 & 0 & 0 & 1 \end{bmatrix}$$

Each of these more complex gates can be generated by other gates from a universal gate set acting on single qubits. As the unitary operations are applied, the resultant state is reached. The number of operations conducted by the circuit is referred to as the layers of the circuit, or its depth.

It can be understood that just as compilers are used for converting programming languages such as C++ into machine code to carry out computations, the same holds true for quantum computing. A method to efficiently build, or synthesize, a quantum circuit to represent the required gates is required.

One well known algorithm for the synthesis of quantum circuits is the Solovay-Kitaev (SK) algorithm. The SK algorithm allows one to perform approximate synthesis of a single-qubit operation over a given set of gates. Synthesis is performed by recursively generating a sequence of gates which at every step moves closer and closer to the target gate, up to some specified precision. However, this algorithm only provides an approximation of the solution. Other approximations have been developed but all share the common disadvantages of being approximations and as such introduce some sort of error. This error is accumulated in quantum computing which requires many operations and hence continuous approximations.

Exact synthesis algorithms also exist. Kliuchnikov et al. 2012 developed an efficient exact synthesis algorithm for single-qubit gates [1]. Exact synthesis algorithms currently proposed for multiple qubits such as in *Giles and Selinger* 2013 [2], are found to be inefficient.

A recent advancement in circuit synthesis is referred to as meet-in-the-middle (MITM) approach. The MITM approach relies on generating a large database of possible circuits, which can be searched through to find two or more identical or similar circuits that can be combined to form a solution. The MITM approach is an improvement over a brute force approach as the lengths of the circuits generated for the database are halved. MITM approach still requires the generation and storage of a database as well searching through it in a time efficient manner.

It is understood in the current state of Quantum computing that the set of all 1-qubit unitary gates with the addition of the 2-qubit CNOT is universal, meaning any n-qubit gate can be written in terms of only 1-qubit and 2-qubit CNOT gates In particular, the T gate, along with all gates from the Clifford group, is known to be a universal gate set for quantum computation. However, in practice it is very expensive to implement the T gate fault-tolerantly. That is, implementing T-gates with very low error rate (which is required for long computations with many T gates) requires introducing complicated measures that consume large amounts of resources. For these reasons, it is important to determine quantum circuits that can be implemented with as few T gates as possible for a given unitary. The number of T gates in a circuit is referred to as its T count, and is considered one of the measures of the optimization of a quantum circuit.

It is therefore an object of the following to obviate or mitigate the disadvantages of the above stated methods for quantum circuit synthesis.

SUMMARY

A method is provided that permits an accurate and efficient synthesis of quantum circuits in a manner that is also applicable to more than one qubit, and can minimize the use of expensive quantum resources.

Accordingly, there is provided a method for implementing an algorithm for forming, or synthesizing, quantum circuits on a system capable of performing the quantum circuit synthesis by using a deterministic walk (i.e. a pseudo-random walk with a random or pseudo-random starting point). In one implementation, the deterministic walk is performed using a parallel search algorithm.

In an implementation of the parallel search algorithm, a user utilizes a programming language to write instructions for a compiler. Then, a meet in the middle approach is utilized to separate the circuit into two halves. Next, the parallel search technique is used to find a claw, or a pair, which satisfies the circuit analysis. Subsequently there is the production of a result and/or a synthesis of the circuit if the pair is found.

In one aspect, there is provided a method for implementing an algorithm for synthesizing quantum circuits, the method comprising: performing one or more deterministic walks on a search space; and performing a circuit synthesis according to results of the one or more deterministic walks.

The method can include determining a smaller search space or a collection of search spaces.

In another aspect, there is provided a method for synthesizing quantum circuits, the method comprising the steps of: generating a starting point; mapping the starting point to a candidate matrix; applying a hash function to the candidate matrix to generate a new point; determining if the new point is a distinguished point; creating a distinguished point structure; storing the distinguished point structure; and finding a merging of trails with matrices of two different types.

In other aspects, there are provided systems and computer readable medium for implementing these methods.

BRIEF DESCRIPTION OF DRAWINGS

Embodiments will now be described by way of example with reference to the accompanying drawings in which.

DETAILED DESCRIPTION

It has been recognized that a deterministic walk can be applied to finding a solution for synthesizing a quantum circuit.

The following provides a method for quantum compilation wherein circuits are synthesized by traversing the search space by means of a deterministic walk. The goal of such a walk is to find collisions or claws between functions which generate unitary matrices (or a sequence thereof) which are equal to or approximately equal to a target unitary. Such a method can be executed in serial, or in parallel, wherein the starting points of the walks are chosen randomly as to traverse the space in an approximately uniform manner. An important aspect of implementing such a method is to develop a mechanism for traversing unitary matrices which enables one to readily find a collision or claw among candidate matrices.

In general traversing such unitary matrices can be accomplished by designing a suitable mapping from unitary matrices to integers or binary strings, over which a walk can be performed (using, for example, a traditional hash function), and where testing for solutions can be performed by comparing two integers or binary strings. The following also provides an example implementation of such a method which performs exact quantum circuit synthesis and makes use of a number of existing frameworks: a parallel collision finding algorithm to perform and distribute the walks, a meet-in-the-middle approach which partitions the search space of possible unitaries, and a circuit synthesis framework which performs synthesis with optimal T-count.

Figure 1:
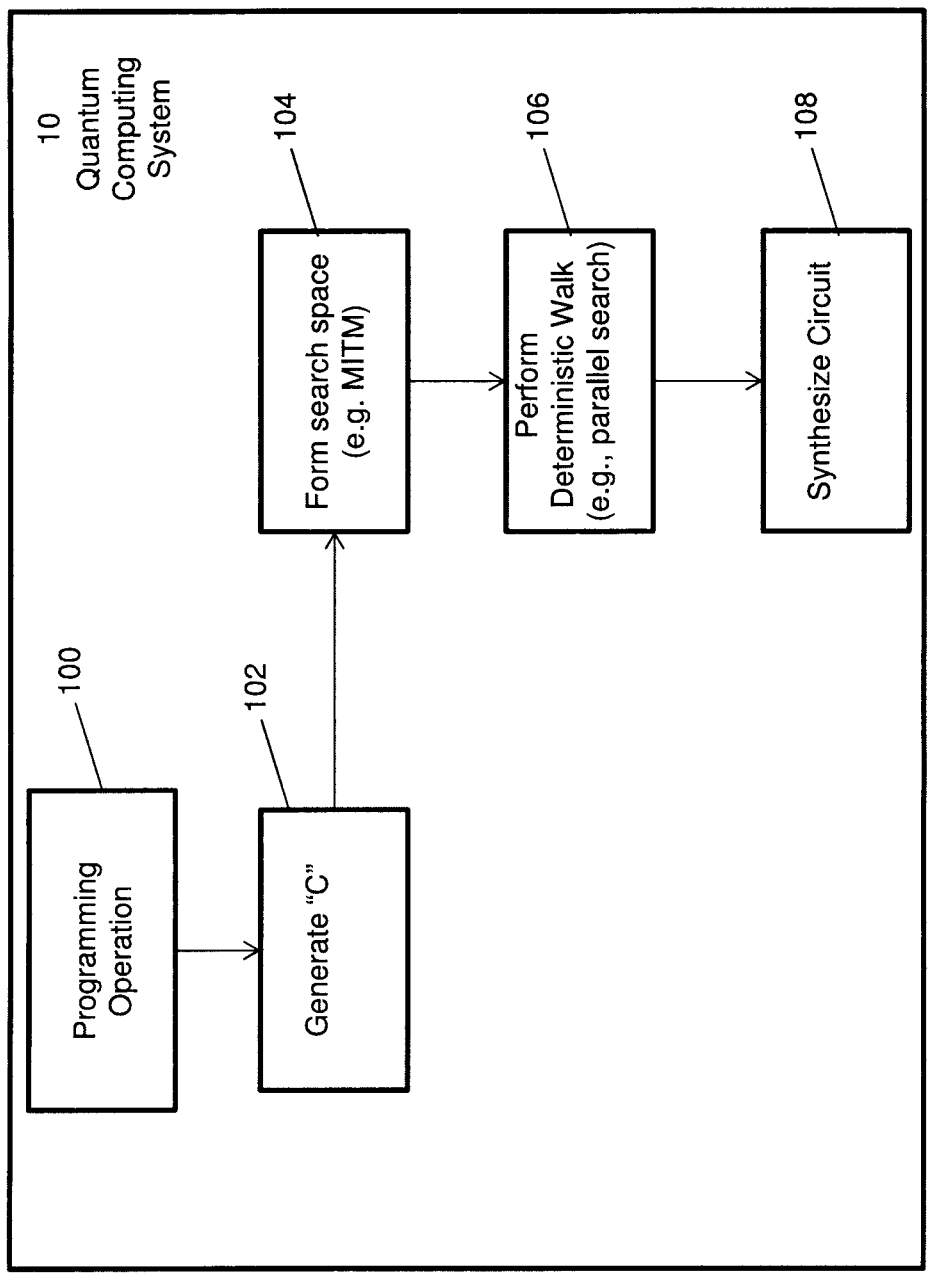
FIG. 1 is a quantum system which utilizes a parallel search algorithm for quantum synthesis.

Turning now to the figures, in one particular implementation, as seen in FIG. 1, on a conventional quantum computing system 10, a circuit C which represents a function to be applied to then qubits is generated at step 102 (e.g., from user input, or a programming operation 100). Let G be a universal gate set:

$$\mathcal{G} = \{G_1, G_2, \ldots G_N\}$$

where $G_i$ are unitary matrices. Therefore, C can be written as:

$$U_k \ldots U_1 = C$$

where, $$U_i \in \mathcal{G} \text{ for } i=1 \ldots k$$

and k is referred to as the depth of the circuit.

It is now required to recover the set of unitary matrices $U_i$ such that the above condition holds. As such, at step 103, the search space is formed, e.g., wherein the meet-in-the-middle (MITM) approach is implemented. Effectively, when the MITM approach is used, the condition discussed above is now split in (roughly) half as shown below, according to one embodiment [3]:

$$U_{[k/2]} \ldots U_1 = U_{[k/2]+1}^\dagger \ldots U_k^\dagger C.$$

The two halves of the meet-in-the-middle approach can be written as V and W and can be represented as matrices such that, $$V = U_{[k/2]} \ldots U_1,$$

$$W = U_{[k/2]+1} \ldots U_k^\dagger C.$$

It will be evident that now instead of producing all combination of the gate set from depth 1 up to the depth k, only combinations up to k/2 need to be produced. To avoid the need to maintain and search an exhaustive database, as provided at step 104, a deterministic walk (e.g., a parallel search technique) is used to synthesize the circuits at step 106, effectively eliminating the need for the typical relatively large database and subsequently searching through said databases, allowing for a faster means of synthesis.

It can be appreciated that with traditional meet-in-the-middle approaches, one stores two lists that have a size that is roughly the square root that of the solution space, and one finds a collision between these lists in order to construct a solution. Walk-based searches, such as "rho" or "lambda" methods, avoid storing these large lists by defining "walks" through these spaces with the property that these walks will eventually cycle or collide, and when this happens a solution can be constructed, with the space required being usually very small. One can also parallelize these walk methods (or utilize other parallel search algorithms) as described herein by way of example. With parallel search, one is using more memory, but searching a much larger space than if only the basic meet-in-the-middle method was used with the same amount of memory and time.

It may be noted that search spaces for large problems are found to be very big, and the databases that would be required to store the search spaces in the conventional meet-in-the-middle approach could be many, many GBs in size. These take space, but also take time to load/query if the database is significantly large. In the deterministic walk approach that utilizes the parallel algorithm described herein, the storage is distributed among many processors, so rather than querying a significantly large, static database, each processor queries its own small portion which can be held in, for example, RAM. While these small chunks could be stored as static databases, it has been found that the memory usage of the program should be modest enough such that this would not be required. However, such an approach can save some computation time, as well as provide some protection in case a run of the code fails.

As well, for the algorithm described herein, various modifications can be made depending on the actual implementation in the code.

The output at step 106 would typically include machine code (or an output that resembles assembly code) that is executed by a quantum computer. The output could also be a description of some hardware configuration that then gets executed (e.g. a design for an optical chip that would implement the algorithm).

Figure 2:
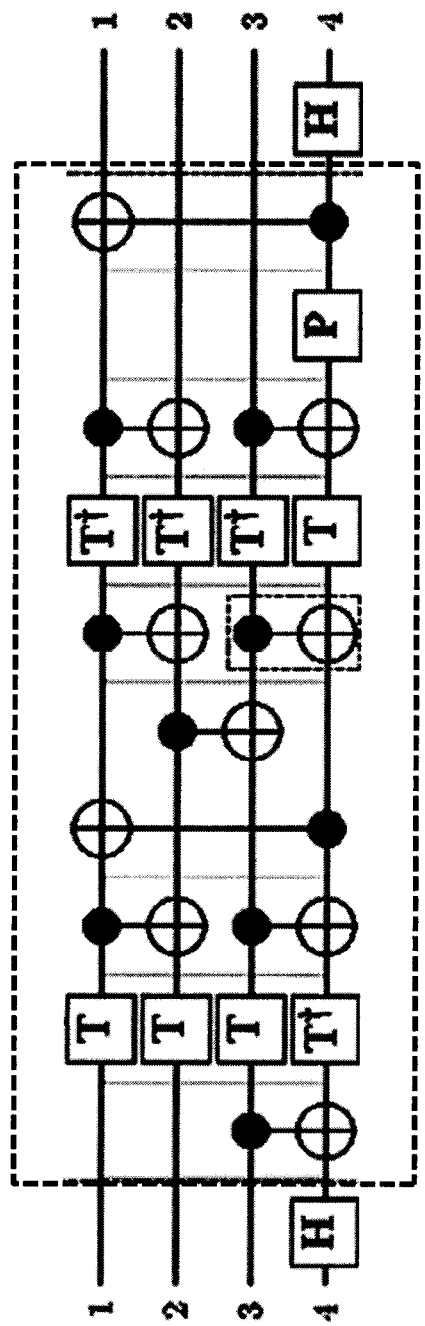
FIG. 2 is an example of a quantum circuit.

That is, the output of the compiler provided by the quantum computing system 10 would provide a quantum machine code that can be sent directly to the quantum hardware. Alternatively, the algorithm can output any number of the following human readable outputs: a quantum circuit in graphical form (such as the example shown in FIG. 2), a quantum circuit in text-based form (e.g. a list of gates), a sequence of unitary matrices, a sequence of binary strings (or something else) which are a mapping to gates/unitary matrices, etc.

When forming the search spaces as discussed herein, it is therefore a goal of the meet-in-the-middle synthesis to find V and W to satisfy the above conditions.

To illustrate a way in which a deterministic walk can be implemented, a method of parallel search is described below, according to one embodiment, and adapted from what is referred to as the parallel collision finding algorithm [4]. In an exemplary embodiment of a parallel collision finding technique, f and g are two different hash functions and are many-to-one functions.

Figure 3:
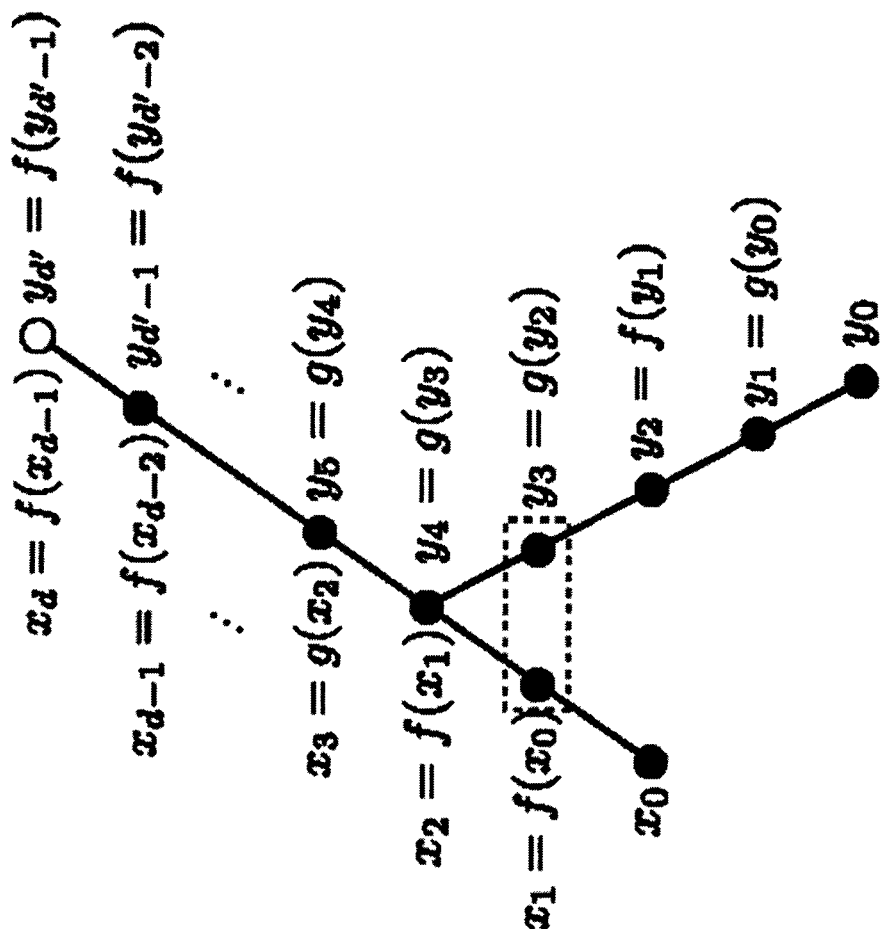
FIG. 3 shows an embodiment of an example instance of the parallel search algorithm.

If an element x and an element y are found such that they are not the same, but both are elements in the domain of the said hash function f, and f(x)=f(y), then x and y are said to be a collision. Conversely, x and y are said to be a claw if f(x) and g(y) are equal. FIG. 3 shows an exemplary algorithm for finding a claw for f and g.

In essence, a collision is a pair of elements in the domain of a function which map to the same element. A claw, on the other hand, is an instance of two elements which cause the two separate functions map to the same element. In this embodiment, a claw is used to find a solution to find the pair V and W. As will be seen, the conditions for V and W can be found if the claw for them is found using the parallel search technique.

The spaces of possible V and W, are mapped in an appropriate way to strings, e.g. representing an integer, referred to as points. A certain fraction of these points are denoted as "distinguished", based on some easily identifiable criteria (in one exemplary embodiment, if taken to be binary strings, said points can be distinguished if their binary representation has a certain number of leading 0s or 1s).

Figure 4:
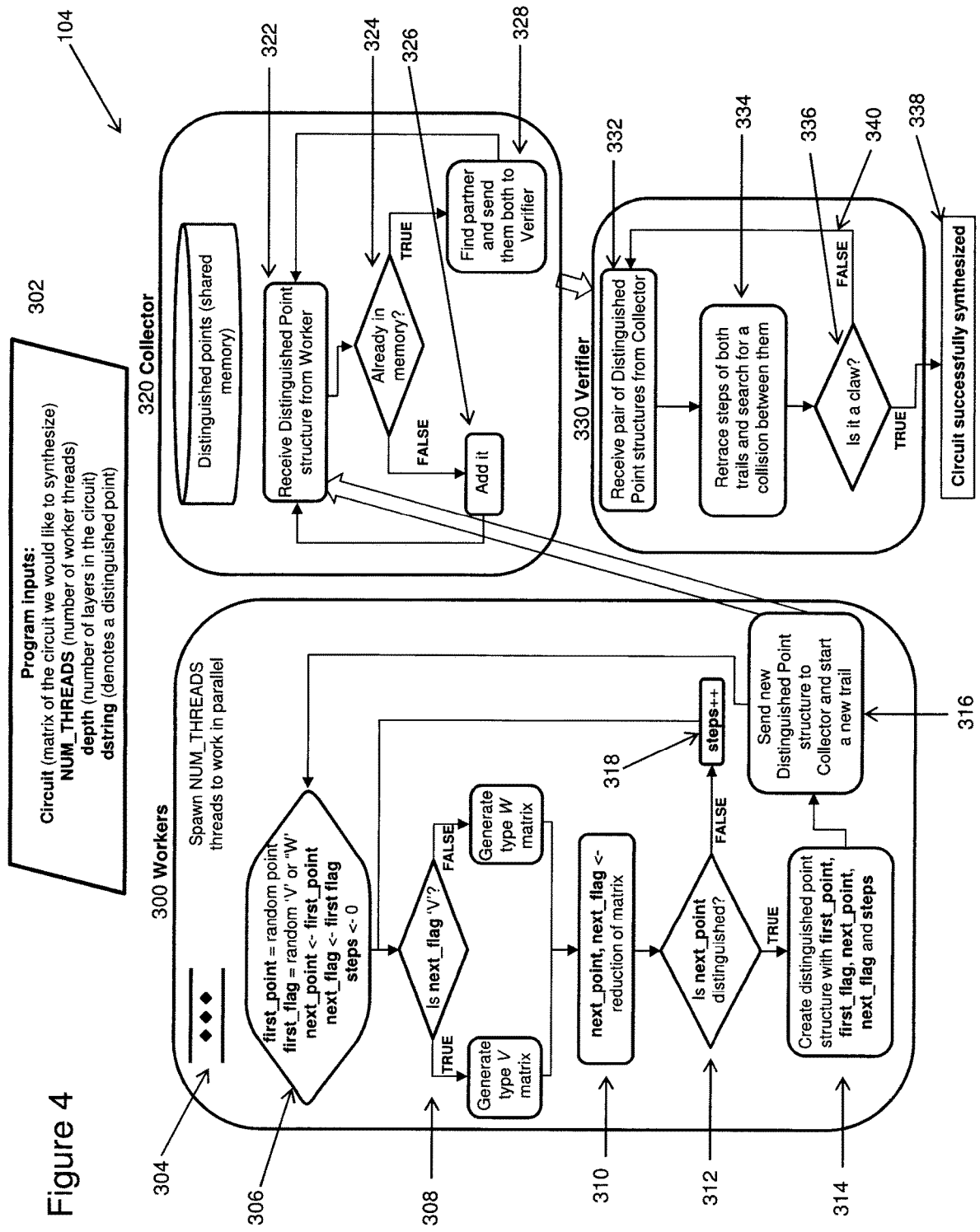
FIG. 4 shows an embodiment of the parallel search for quantum circuit synthesis as shown in FIG. 1.

As shown in FIG. 4, to begin, a series of inputs 302 are provided at step 304 into the search algorithm workers 300 (i.e. the processors uses to search for the distinguished points). These inputs include the number of parallel threads working to carry out the process, the matrix of the circuit to be synthesized, the depth of the circuit, and the criteria for being a distinguished point.

Next, a random starting pair is generated at step 306, which includes a point, and a flag which indicates whether to generate a matrix of type V, or type W as shown in step 308. By a procedure appropriate to the application and form of V and W, the point is mapped to a representative of a candidate matrix. After such a representative is computed, it is 'hashed' or reduced back down to a new pair ($i_0$; $f_0$). This reduction can be seen at step 310 and is close to random, so that any point or flag value is roughly equally likely to occur. Next, the algorithm performs a check at step 312 to see if $i_0$ is a distinguished point. If it is a distinguished point, the trail terminates and a distinguished point structure is created at step 314, and the distinguished point is provided to a collector 320 for processing at step 316. If the point is not distinguished, then there is a repeat of the above procedure, while increasing the counter at 318 until either a distinguished point is found, or some previously defined maximum iteration limit is reached.

Pairs containing distinguished points found by this procedure are stored on one or more specialized processors called collectors (denoted by the collector 320 shown in FIG. 4). When a new distinguished point is found, it is transferred at steps 316 and 322, and there is an attempt to insert its pair into the central storage location, by checking if there is already an item in memory with the same distinguished point at step 324. If a pair with the same distinguished point does not already exist in the set, the new pair is added at step 326. The process that found the distinguished point then chooses a new random starting pair and continues generating circuit candidates.

If, in the set, there is an existent pair with the same distinguished point, a collision event has occurred. To end at the same point, the two trails have merged at some time during their execution, the partners are found at step 326, and at step 328 are sent to a verifier 330.

Within the verifier 330, the pair of distinguished points is received at step 332 and the steps of the collisions are retraced from the beginning at step 334 until the point where the representative candidate matrices are equal is found. In some cases, the matrices will both be of type V, or both of type W. In this instance it is not a claw, however if at step 336 it is found that there is a type V and a W matrix, a claw has been found. The goal of the parallel search is to find a claw, or a merging of trails where one candidate matrix is type V, and one is type W. When a claw is found at step 338, a circuit has been determined that can be effectively synthesized, since finding a single claw solves the circuit synthesis problem.

As can be seen, parallel collision finding is a framework which can be applied to many instances of the circuit synthesis problem. One such example will now be discussed. The exemplary application discussed is the synthesizing of optimal T-count circuits. As discussed previously, circuits with an optimal number of T gates (T-count) are desired due to T-gates being "expensive" operations.

First, using a circuit C based on n qubits, C can be rewritten as the following product of gates:

$$R(Q_t)R(Q_{t-1}) \ldots R(Q_1)K=C.$$

Where t is the T-count of C (which can be found using the algorithm in [5]), K is a Clifford gate, and $Q_i$ are n-qubit Pauli operations. R(Q) is given by:

$$R(Q) = \frac{1}{2}(1+\exp^{i\frac{\pi}{4}})1 + \frac{1}{2}(1-\exp^{i\frac{\pi}{4}})Q.$$

Essentially, each $R(Q_i)$ in the equation for the circuit C contributes a single T-gate to the T-count such that the total product of all $R(Q_i)$ yields a circuit with optimal T-count t.

It is particularly convenient to consider the channel representations of all matrices in the equation for the circuit C:

$$\widehat{R(Q_t)}\ \widehat{R(Q_{t-1})}\ \ldots\ \widehat{R(Q_1)}\hat{K}=\hat{C}.$$

Using the meet-in-the-middle approach, one can split the above matrix representation in half such that:

$$\widehat{R(Q_{\lceil \frac{t}{2} \rceil})}\ \ldots\ \widehat{R(Q_1)}\ \hat{K} = \widehat{R(Q_{\lceil \frac{t}{2} \rceil+1})}^\dagger\ \widehat{R(Q_t)}\hat{c}\ \hat{V}\hat{K}=\hat{W}.$$

where it can be seen that there has been a relabeling of the product of $\widehat{R(Q_i)}$ as $\hat{V}$ and $\hat{W}$ for convenience.

It is known that if the coset labels of $\hat{V}$ and $\hat{W}$ are the same, then there exists a Clifford K such that the above relations hold [5].

Finally, the parallel collision can be applied to find this situation by generating candidate $\hat{V}$ and $\hat{W}$, and using their coset labels to compute the next point and flag in the trail. In this way, if a collision event occurs, it will be because two coset labels which are equal were found. If such a situation was the result of a claw, then it both $\hat{V}$ and $\hat{W}$ have been found and as a consequence it is possible to recover $\hat{K}=\hat{V}^\dagger\hat{W}$.

An implementation of the above technique using a computer program listing is provided in the attached Appendix I. The implementation was done in the C++ programming language using OpenMP for parallelization within a single compute node. The code has been tested on Sharcnet's Orca computing platform, on a node with 16 processors and achieved an improvement in runtime on average (over the original meet-in-the-middle algorithm), where averaging was over multiple trials for 5 different 3-qubit circuits (Toffoli, negated Toffoli, Fredkin, Peres, and the quantum OR gate).

As will be appreciated, the embodiment shown herein is a hybrid implementation. Hybrid refers to the style of parallel programming, using both a message-passing module for communication between separate computers, and threaded parallel directives within the multiple cores of a single computer. Other versions of this algorithm can be implemented using only threading, or by adding more collectors 320 and verifiers 330 in the hybrid implementation. A full-scale hybrid system could also be used to permit more even distribution of the workload and avoid communication bottlenecks. Such a system would have the ability to use multiple nodes, and thus more processors, which will lead to a great improvement in run-time. It will be further appreciated that such a system will allow for the synthesis of larger circuits.

Figure 5:
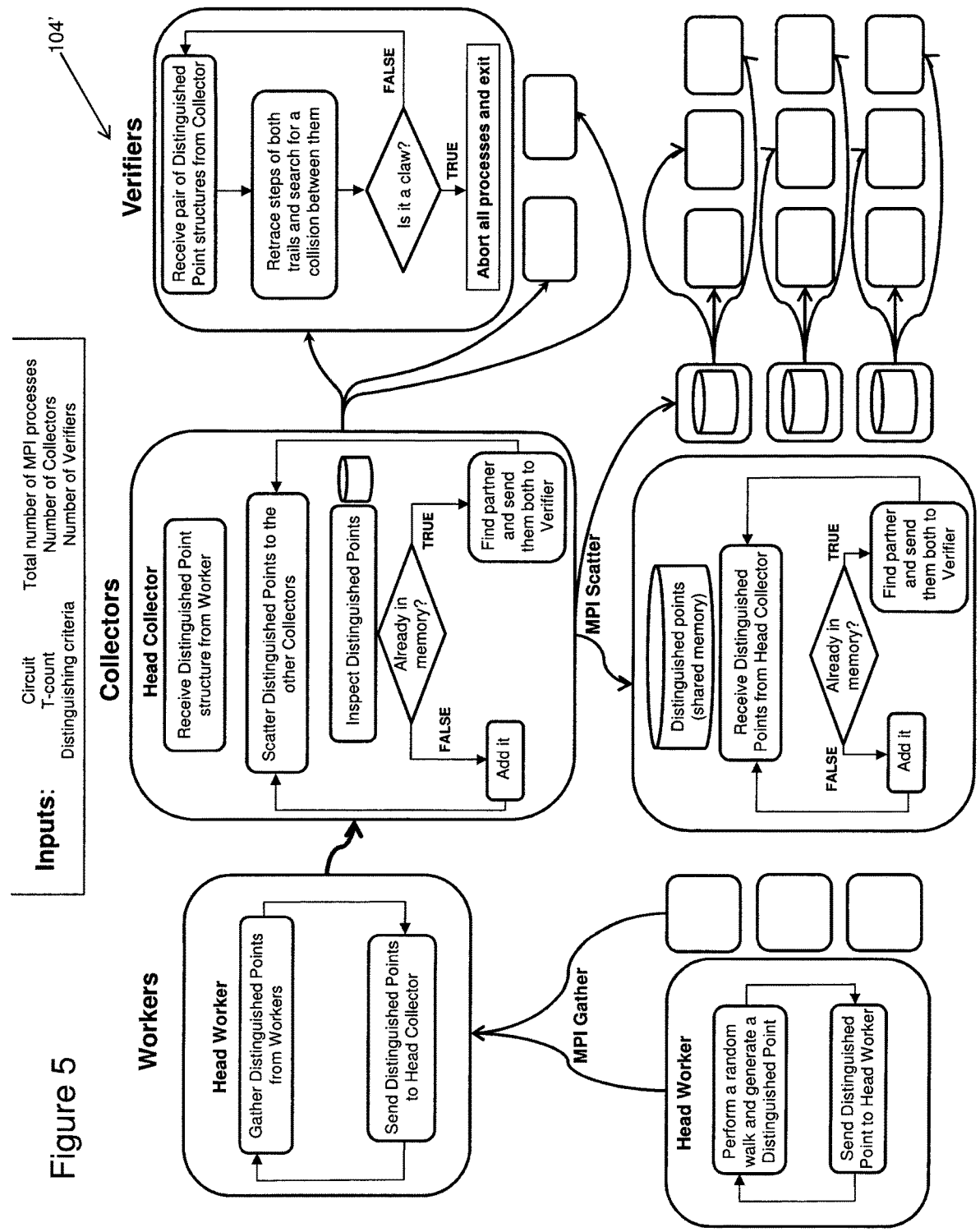
FIG. 5 shows another embodiment of the parallel search for quantum circuit synthesis.

The program listed in Appendix I is but one example of how a programmer can envision implementing such an algorithm. The structure of this specific program is represented graphically in FIG. 5. The number of collectors, workers, and verifiers are parameters which can be tweaked by the end user depending on the size of the problem. FIG. 5 accomplishes communication between processors using the Message Passing Interface, or MPI set of protocols. Other possibilities for implementation include a threaded approach, using, for example, OpenMP, which would limit the parallelization to a single computational node. Another example, such as that embodied in FIG. 4, is to use a hybrid MPI/threaded approach, where some computational nodes run threaded code (for example, to compute distinguished points) while others do not, and all nodes are able to communicate with each other via MPI.

Finally, the particular embodiment shown provides a framework for quantum circuit synthesis, any algorithm which can leverage meet-in-the-middle techniques can benefit from being parallelized in this way. An exemplary embodiment of the above stated algorithm is provided for clarification.

REFERENCES

[1] V. Kliuchnikov, D. Maslov, M. Mosca (2013) Quantum Info. Comput. 13 (7-8) 607-630.
[2] B. Giles and P. Selinger (2013) Phys. Rev. A 87 032332.
[3] M. Amy, D. Maslov, M. Mosca, and M. Roetteler (2013) IEEE Trans. Comput.-Aided Design Integr. Circuits Syst. 32 (6), 818 (for meet-in-the-middle quantum circuit synthesis).
[4] P. C. van Oorschot and M. J. Wiener (1999) J. Cryptology 12 (1) 1-28 (for everything parallel-collision finding).
[5] D. Gosset, V. Kliuchnikov, M. Mosca, V. Russo (2014) Quantum Info. Comput. 14 (15-16) 1261-1276.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the programming operation 100 or system 1, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

APPENDIX I—COMPUTER PROGRAM LISTING

APPENDIX I – COMPUTER PROGRAM LISTING

Contents:
1 - Parallel collision finding routines and processor distribution
13 - Data structure for random walking over unitary matrices
22 - Data structure for unitary matrices and operations thereupon used in specific implementation
38 - Hashing operations for unitary matrices

```
/*------------------------------------------------------------------------
 * The software program comprising pQCS and related documentation provided below
 * (collectively, the "Software") are owned by Michele Mosca, including all
 * copyright and other intellectual property therein.
 *
 * The Software made available below may be used on a royalty-free basis solely
 * for non-commercial purposes of research and validation. No license, either
 * implied or explicit, is granted outside this limited field of use. The
 * Software and developments of the Software may not be redistributed or made
 * available through other channels, including Open Source libraries, without
 * the explicit agreement in writing of Michele Mosca. This Software is provided
 * on an "as is" basis and all representations and warranties, express or
 * implied, are disclaimed.
 *
 * You shall maintain all copyright attributions contained in the Software,
 * including in its source code, and provide full and complete attribution to
 * Michele Mosca for use of the Software in any resulting publication.
 *
 * Author: Olivia Di Matteo, 2015
 * Institute for Quantum Computing, Quantum Circuits Group
 *------------------------------------------------------------------------*/ include "./mitm_routines.h"

include <boost/mpi.hpp>
#include <boost/mpi/environment.hpp>
#include <boost/mpi/communicator.hpp>
include <boost/mpi/timer.hpp> include <cstring>
include <string>
#include <bitset>
#include <cstdlib>
#include <unordered_map>
#include <iostream>
include <sstream>
#include <utility>
#include <vector>
#include <random>
include <climits> include "channel_rep.h"
include "rmatrix.h"
#include "ringrt2.h"
#include "ringzi.h"
#include "mitmbox.h"
#include "distinguishedpoint.h"
#include "circuit.h"
#include "configs.h"

using namespace std;

// Message tags for MPI message passing
int INCOMING_DP_TAG = 2718;
int FOUND_DP_TAG = 314;
int CLAW_FIND_TAG = 42;
int ABORT_TAG = 666;

// Print runtime statistics. Called by the verifier when claw is found.
```

```
void print_statistics(double run_time, int num_claws, int num_collision_points,
                      int num_false_positives, int func_id) {
  cout << endl;
  cout << "Run time was " << run_time << " s" << endl;
  cout << endl;
  cout << num_claws << " claws were found." << endl;
  cout << num_collision_points << " collisions were found." << endl;
  cout << num_false_positives << " false positives were found." << endl;
  cout << "-----------------------------------------------------------" << endl;
  cout << func_id + 1 << " function"
       << ((func_id == 0) ? (" was "):("s were ")) << "tried." << endl;
}

/**
 * Trace the collision between two distinguished points.
 *
 * Apply \link MITMBox::f_single() to dp1 and dp2. Start by stepping
 * through the longer of the two chains until there is an equal amount
 * of steps left in each. Then step them both together. At each point,
 * check if the coset labels are equal. If they are, then we have a
 * collision. We can then check if it's a claw. If no collision or claw is
 * found, the collision is a false positive.
 *
 * @param dp1 A distinguished point
 * @param dp2 A second distinguished point with the same final hash
 * @param circuit The matrix representation of the circuit to simulate
 *
 * @return 1 for a claw
 * @return 0 for a collision
 * @return -1 for a false positive
 */
int find_claw(int func_id, int subset_id, DistinguishedPoint dp1,
              DistinguishedPoint dp2, ChannelRep circuit) {
  // If two points collide, it's because they have the same hash.
  // To have the same hash, they should presumably have the same matrix
  // product, meaning one of two things:
  // 1) There was a collision between two functions f1/f1, or f2/f2
  // 2) We have found a claw, i.e. f1/f2 have produced the same matrix
  // We are are really only interested in cases where f1 and f2 collide.
  if (Configs::DEBUG) {
    cout << endl;
    cout << "Entering function find_claw" << endl;
    cout << endl;
    cout << "The two distinguished points are " << endl;
    dp1.print();
    cout << endl;
    dp2.print();
    cout << endl;
  } if (dp1.is_equivalent(dp2)) {
    if (Configs::DEBUG)
      cout << "Distinguished points are equivalent - "
           << "they will go to the same place." << endl;
    return 0;
  } std::stringstream first_function_1_ss;
  std::stringstream first_function_2_ss;
  first_function_1_ss << dp1.first_function;
  first_function_2_ss << dp2.first_function;

// Initialize the two objects
  MITMBox box1(func_id, subset_id, dp1.x0, first_function_1_ss.str(),
               Configs::DEPTH, circuit);
  MITMBox box2(func_id, subset_id, dp2.x0, first_function_2_ss.str(),
```

```
        Configs::DEPTH, circuit);

int offset;
size_t num_steps = 0;
size_t max_steps;  // Length of the longest train
int last_func_1, last_func_2;

// Start stepping through the longer of the chains
if (dp1.d > dp2.d) {
  if (Configs::DEBUG)
    cout << "Stepping through dp1, the longer of the two chains " << endl;

max_steps = dp1.d;
  offset = dp1.d - dp2.d;
  while (offset > 0) {
    box1.f_single();
    if (Configs::DEBUG) {
      cout << "Box 1 paulis are " << endl;
      box1.print_paulis();
      cout << endl;
      cout << "Box 1 coset label is " << endl;
      box1.print_coset_label();
      cout << endl;
    }
    offset--;
    num_steps++;
  }
} else if (dp1.d < dp2.d) {
  if (Configs::DEBUG)
    cout << "Stepping through dp2, the longer of the two chains " << endl;

max_steps = dp2.d;
  offset = dp2.d - dp1.d;
  while (offset > 0) {
    box2.f_single();
    if (Configs::DEBUG) {
      cout << "Box 2 paulis are " << endl;
      box2.print_paulis();
      cout << endl;
      cout << "Box 2 coset label is " << endl;
      box2.print_coset_label();
      cout << endl;
    }
    offset--;
    num_steps++;
  }
} else {
  // Equal number of steps to the hash
  max_steps = dp1.d;
} if (Configs::DEBUG)
  cout << "Stepping through together the rest of the way " << endl;

// Step the rest of the way
while (num_steps < max_steps && (num_steps < Configs::MAX_ITER)) {
  // Collect information on which function we used
  last_func_1 = box1.get_next_function();
  last_func_2 = box2.get_next_function();
  // We need to keep copies of these guys in case there is a collision // Do the next step
  box1.f_single();
  if (Configs::DEBUG) {
    cout << "Box 1 paulis are " << endl;
    box1.print_paulis();
    cout << endl;
```

```
    cout << "Box 1 coset label is " << endl;
    box1.print_coset_label();
    cout << endl;
  } box2.f_single();
  if (Configs::DEBUG) {
    cout << "Box 2 paulis are " << endl;
    box2.print_paulis();
    cout << endl;
    cout << "Box 2 coset label is " << endl;
    box2.print_coset_label();
    cout << endl;
  }

// Increment the number of steps
  num_steps++;

// Compare the coset labels - if they're the same, last iteration worked
  if (*(box1.get_coset_label()) == *(box2.get_coset_label())) {
    if (Configs::DEBUG)
      cout << "Found equal coset labels " << endl;

if (last_func_1 == last_func_2) {  // Collision
      if (Configs::DEBUG) {
        cout << "Boxes used the same function. "
             << "Collision found, but not a claw." << endl;
        cout << endl;
      }
      return 0;
    } else {   // Claw!
      cout << endl;
      cout << "Claw found in function " << func_id
           << " at step " << num_steps
           << " with box 1 using function " << last_func_1
           << " and box 2 using function " << last_func_2
           << "." << endl;

cout << "The resultant Paulis are (ordered from 1 to k): " << endl;

if (last_func_1 == 1) {
        box1.print_paulis();
        box2.print_paulis();
      } else {
        box2.print_paulis();
        box1.print_paulis();
      } if (last_func_1 == 1 && last_func_2 == 2) {
        // Box 1 used f1 and box 2 used f2
        // We need to compute the matrix C
        ChannelRep *Vd = new ChannelRep(pow(2, Configs::NUM_QUBITS));
        ChannelRep *W = box2.get_matrix_product();
        (box1.get_matrix_product())->adj(*Vd);

ChannelRep C = (*Vd)*(*W);

cout << " The channel representation of matrix C is " << endl;
        C.print();
        cout << endl;

if (Configs::DEBUG) {
          cout << "Double checking that they move together still "
               << endl;
          box1.f_single();
          cout << endl;
          box2.f_single();
```

```
            cout << endl;
        } delete Vd;
        return 1;
    } else if (last_func_1 == 2 && last_func_2 == 1) {
        // Box 2 used f1 and box 1 used f2
        // We need to compute the matrix C
        ChannelRep *Vd = new ChannelRep(pow(2, Configs::NUM_QUBITS));
        ChannelRep *W = box1.get_matrix_product();
        (box2.get_matrix_product())->adj(*Vd);
        ChannelRep C = (*Vd)*(*W);

cout << " The channel representation of matrix C is " << endl;
        C.print();
        cout << endl;

if (Configs::DEBUG) {
            cout << "Double checking that they move together still "
                 << endl;
          box1.f_single();
            cout << endl;
            box2.f_single();
            cout << endl;
        } delete Vd;
        return 1;
        }
    } // End if coset labels are equal and it's a claw
    } // End is claw
  } // End while loop stepping through DP if (Configs::DEBUG) {
    cout << "No equal coset labels found, must have been a false positive."
         << endl;
  }
  return -1;
} // end function find_claw /**
 * Spawn threads, generate distinguished points, and send them to
 * find_claw if we need to. This is where all the exciting stuff happens!
 *
 * @param depth The full depth of the circuit.
 * @param circ The circuit we are simulating.
 * @param size The number of MPI processes
 * @param rank The ID of this MPI process
 * @param world The MPI communicator containing everything
 * @param workers The MPI communicator containing only the workers
 */
void mitm_mpi(ChannelRep circ_crep, int size, int rank,
              boost::mpi::communicator world,
              boost::mpi::communicator workers,
              boost::mpi::communicator collectors) { world.barrier();

if (rank == Configs::HEAD_WORKER) {
    cout << "Starting MPI parallel routines." << endl;
  } if (rank >= 0 && rank < Configs::NUM_COLLECTORS) {
    //================================================================
    //
    //                        COLLECTOR
```

```
//                MPI process 0 - Configs::NUM_COLLECTORS
//
// Collectors are the keepers of distinguished points. The map
// of DP is stored by this process.
//
// Distinguished points are received from any process that is
// actively searching for points (processes Configs::NUM_COLLECTORS to
// np - 2).
//
// When there are multiple collectors, distinguished points are
// binned by modding the hash by Configs::NUM_COLLECTORS. Each separate
// Collector keeps all points with the same modulus value.
//
// When DP are received, Collectors attempt to add them to the map.
// If they succeeds, it carries on and waits for the next message.
//
// If they find that a received point has a partner in the map
// already, it sends the pair of points to a Verifier for
// further inspection.
//
//================================================================
//cout << "Collector " << rank << " checking in." << endl;

// Variables to keep track of which subset we are in
// so that we never add distinguished points to the wrong set
int current_function = 0;
int current_subset = (Configs::DEPTH % 2 == 0) ? (-1) : (Configs::FIRST_SUBSET);

// Centralized storage of distinguished points in a map.
// Key value pair is the hash, and the DistinguishedPoint
// it was found in.
std::unordered_map<unsigned long long, DistinguishedPoint> found_dp;
std::unordered_map<unsigned long long, DistinguishedPoint>::iterator map_it;

// Identifies which verifier to send to
// This will be a cyclic number in the range
// 0, 1, ... Configs::NUM_VERIFIERS / Configs::NUM_COLLECTORS - 1
// so that sending of pairs of points will occur in
// a round-robin fashion.
int next_verifier_id = 0;
int verifiers_per_collector = Configs::NUM_VERIFIERS / Configs::NUM_COLLECTORS;

// Process 0 must receive a termination message from each process
// before it exits to prevent the workers from trying to send
// messages to nowhere because process 0 has exited before them.
// This is currently not implemented; we use mpi_abort instead.
int num_exit_messages = 0;

while (num_exit_messages != (size - Configs::NUM_COLLECTORS)) {
  collectors.barrier();

// Vector of DistinguishedPoints when receiving from workers
  int expected_dps;
  std::vector<DistinguishedPoint> recvd_dps; // Points just for this collector
  std::vector<DistinguishedPoint>::iterator vec_it;

// Receive information about quantity of distinguished points from head worker
  // and distribute amongst all the collectors using a scatter operation.
  if (rank == 0) { // Head collector
    std::vector<int> points_per_collector; // Receive info about the points
    world.recv(Configs::HEAD_WORKER, INCOMING_DP_TAG, points_per_collector);

boost::mpi::scatter(collectors, points_per_collector, expected_dps,
Configs::HEAD_COLLECTOR);
  } else {
```

```
      boost::mpi::scatter(collectors, expected_dps, Configs::HEAD_COLLECTOR);
    } collectors.barrier();

// Receive and then distribute the actual distinguished points from
    if (rank == 0) {
      std::vector<std::vector<DistinguishedPoint> > collective_recvd_dps; // All points send out
      collective_recvd_dps.reserve(Configs::NUM_COLLECTORS);
      world.recv(Configs::HEAD_WORKER, FOUND_DP_TAG, collective_recvd_dps);

recvd_dps.reserve(expected_dps);
      boost::mpi::scatter(collectors, collective_recvd_dps, recvd_dps, Configs::HEAD_COLLECTOR);
    } else {
      recvd_dps.reserve(expected_dps); // Make space
      boost::mpi::scatter(collectors, recvd_dps, Configs::HEAD_COLLECTOR);
    } if (recvd_dps.size() == 0) {
      // Only a single DP received...
      // Nothing to see here... go back and wait for more data
      continue;
    } else if (recvd_dps.size() == 1) {
      // Use empty DP as a notice of when the function changes
      if (recvd_dps[0].first_function == 'c') {
        // Change the function/subset
        current_function = recvd_dps[0].func_id;
        if (Configs::DEPTH % 2 == 1)
          current_subset = recvd_dps[0].subset_id;

found_dp.clear(); // Dump all DP and start fresh
        collectors.barrier(); // Put a barrier here so when the map gets dumped, all collectors
wait
        continue;
      }
    } if (Configs::DEBUG) {
      cout << "Process " << rank
           << " received the following distinguished points: " << endl;

for (vec_it = recvd_dps.begin(); vec_it != recvd_dps.end(); vec_it++)
        (*vec_it).print();
      cout << endl;
    }

// Make sure everything is coming from the correct function/subset
    if (recvd_dps[0].func_id != current_function ||
        recvd_dps[0].subset_id != current_subset) {
      cout << "Was not from the right function or subset." << endl;
      recvd_dps[0].print();
      continue;
    }

// Pass through all the distinguished points
    for (vec_it = recvd_dps.begin(); vec_it != recvd_dps.end(); vec_it++) {
      map_it = found_dp.find((*vec_it).current_hash);

if (map_it != found_dp.end()) { // Found the DP in the map already
        if (Configs::DEBUG)
          cout << "DP was already in the map!" << endl;
        DistinguishedPoint map_dp = (*map_it).second;
        DistinguishedPoint colliding_dp[2] = {*vec_it, map_dp};

// Send data to corresponding verifier
        world.send(rank + (next_verifier_id + 1)*Configs::NUM_COLLECTORS,
                   CLAW_FIND_TAG, colliding_dp);
```

```
            next_verifier_id = (next_verifier_id + 1) %
                               verifiers_per_collector;

// Replace the old DP with the new one so we mix things up
            // (may remove this at some point)
            found_dp.erase(map_dp.current_hash);
            found_dp.insert(std::pair<unsigned long long, DistinguishedPoint>
                            ((*vec_it).current_hash, *vec_it));
          } else {  // We didn't find the DP, so let's add it
            found_dp.insert(std::pair<unsigned long long, DistinguishedPoint>
                            ((*vec_it).current_hash, *vec_it));
          } // End didn't find DP in the map
        } // End loop through all received distinguished points recvd_dps.clear();
    } // End receiving data while loop
  } else if (rank >= Configs::NUM_COLLECTORS && rank < Configs::HEAD_WORKER) {
    //=================================================================
    //
    //                            VERIFIER
    // MPI processes Configs::NUM_COLLECTORS -> Configs::HEAD_WORKER
    //
    // These are the processes that run the claw checker. They
    // continuously receive pairs of DP from process 0 when there is
    // the possibility of a claw.
    //
    // If the claw is found, this process should spread the good news
    // to all using an MPI broadcast message (er, well, currently
    // it's an MPI abort call until we get the termination sequence
    // working correctly).
    //
    // This process also keeps track of all the statistical and timing
    // data, such as the number of collisions and claws, and how long
    // this whole program has run. It is the process responsible for
    // displaying all this data at the end.
    //
    //================================================================= int exit_flag = 0;

//cout << "Verifier " << rank << " checking in." << endl;

int num_collision_points = 0;  // No. of trails that produced a collision
    int num_claws = 0;  // No. of trails that produced the magical claw
    int num_false_positives = 0;  // No. of trails that produced nothing DistinguishedPoint dp_pair[2];  // Holds the received pair of DP int is_claw;  // Holds result of find_claw boost::mpi::timer mpi_timer;  // Start the clock while (exit_flag == 0) {
      world.recv(rank % Configs::NUM_COLLECTORS, CLAW_FIND_TAG, dp_pair);

// Make sure the DP came from the same place
      assert(dp_pair[0].func_id == dp_pair[1].func_id);
      assert(dp_pair[0].subset_id == dp_pair[1].subset_id);

is_claw = find_claw(0, dp_pair[0].subset_id,
                          dp_pair[0], dp_pair[1], circ_crep);

if (Configs::DEBUG)
        cout << "Process " << rank << " received a pair of DP." << endl;

if (is_claw == 1) {  // Found a claw
        num_claws++;
```

```cpp
        double end_time = mpi_timer.elapsed();   // Stop the clock
        print_statistics(end_time, num_claws,
                    num_collision_points, num_false_positives, 0);

// This is a termporary solution. In the future, we
        // will develop a more effective termination sequence than
        // using abort.
        boost::mpi::environment::abort(1);
      } else if (is_claw == 0) {   // Collision
        num_collision_points++;
      } else if (is_claw == -1) {  // False positive
        num_false_positives++;
      } else {
      cout << "Something went wrong." << endl;
      }
    }  // End receiving data while loop
  } else {
    //================================================================
    //
    //                        WORKERS
    //         MPI processes Configs::HEAD_WORKER -> size
    //
    // This section handles all the "other" processes. These are the
    // ones that generate MITMBoxes and trails and actually do the
    // searching for distinguished points. When they find points, they
    // send them to process 0 for processing.
    //
    //================================================================

//cout << "Worker " << rank << " checking in." << endl;

// Each thread keeps track of the number it has done separately
    size_t num_trails_this_processor = 0;

// Total max no. of trails each function should generate before
    // switching functions
    unsigned long long max_trails_per_function = 10 * Configs::NUM_DP;

// Total number of trails each processors should run
    // Depends on both the number of OpenMP and MPI processes
    unsigned long long max_trails_per_processor = 1 +
          (int) (max_trails_per_function * 1.0 / Configs::NUM_WORKERS);

size_t func_id = 0;   // ID of the function version we're using (starts at 0)
    size_t subset_id = Configs::FIRST_SUBSET;  // First subset, used to checkpoint
    unsigned long long num_subsets = 1;

if (Configs::DEPTH % 2 == 1) {
      // Compute the number of subsets if the depth is odd
      // We need to use unsigned long longs as otherwise the numerator overflows
      // We also need to use pow rather than bitwise ops because those overflow
      unsigned long long subset_numerator =
            pow(4, Configs::NUM_QUBITS * (Configs::DEPTH/2 + 1));
      unsigned long long subset_denominator =
            pow(4, Configs::NUM_QUBITS * (Configs::DEPTH/2));
      num_subsets = subset_numerator / subset_denominator;
    }

// Set up terminal and empty DPs to set when we finish
    // They're vectors because we're sending a vector now
    DistinguishedPoint empty_dp(0, 'c', 0, -1, -1, -1);
    std::vector<DistinguishedPoint> single_empty_dp_vec;
    single_empty_dp_vec.push_back(empty_dp);

std::vector<int> collector_dump_notify(Configs::NUM_COLLECTORS, 1); // Vector of all 1s to
signal end
```

```cpp
  std::vector<std::vector<DistinguishedPoint> > empty_dp_vec(Configs::NUM_COLLECTORS,
single_empty_dp_vec);

// Storage for found distinguished points
  DistinguishedPoint found_dp;

// Output initial data
  if (rank == Configs::HEAD_WORKER) {
    cout << "Max trails per function: "
         << max_trails_per_function << endl;
    cout << "Max trails per processor: "
         << max_trails_per_processor << endl;
    if (Configs::DEPTH % 2 == 1) {
      cout << "There are " << num_subsets
           << " subsets of the larger space to search through."
           << endl;
    }
    cout << endl;
  }

// Set the random number generator (one per worker, we will probably
  // have to change this to be thread safe eventually
  std::random_device rd;
  // Seed the Mersenne-twister with true randomness
  std::mt19937_64 mt(rd());
  // The actual random number generator
  std::uniform_int_distribution<unsigned long long>
           rand_ullong(0, ULLONG_MAX);

// Trail generation - continues 'til someone calls MPI_ABORT
  while (true) {
    if (rank == Configs::HEAD_WORKER && num_trails_this_processor == 0) {
      cout << "Beginning the search with function version "
           << func_id << endl;
      if (Configs::DEPTH % 2 == 1)
         cout << "Working with subset " << subset_id << endl;
    }

// All trails but the head worker will make a trail
    if ((num_trails_this_processor < max_trails_per_processor) &&
        (workers.rank() != 0)) {
      if (Configs::DEBUG)
        cout << "Starting new trail." << endl;

// Keep track of the number of trails we create
      num_trails_this_processor++;

// randomly generate a starting hash and starting function
      int first_function = rand_ullong(mt) % 2;
      string first_function_string;
      if (first_function)
        first_function_string = "0";
      else
        first_function_string = "1";

unsigned long long first_hash = rand_ullong(mt);
      if (Configs::DEBUG)
        cout << "Initial hash is " << first_hash << endl;

// Each thread gets an MITMBox, with the ID of the
      // reduction function we're doing.
      MITMBox box(func_id, subset_id, first_hash,
                  first_function_string, Configs::DEPTH, circ_crep);
      found_dp = box.f();

if (Configs::DEBUG) {
        if (!found_dp.is_empty()) { // If it's empty, do nothing
```

```cpp
          cout << endl;
          cout << "Found distinguished point" << endl;
          found_dp.print();
          cout << endl;
        }
      }
    } else { // Head worker simply increments count to know when to stop
      num_trails_this_processor++;
    } workers.barrier(); // Everyone stops here before data gets sent

// For the head worker
    std::vector<DistinguishedPoint> aggregated_dps;

// Gather all the found distinguished points on a single worker
    if (workers.rank() == 0) { // Head worker
      aggregated_dps.reserve(Configs::NUM_WORKERS);
      boost::mpi::gather<DistinguishedPoint>(workers, found_dp, aggregated_dps, 0);
    } else { // All other workers send data to head worker
      boost::mpi::gather(workers, found_dp, 0);
    }

// Head worker sends out the data, other processes continue making trails
    if (workers.rank() == 0) {
      // Keep track of the points to be sent out to all the collectors
      std::vector<int> counts_per_collector(Configs::NUM_COLLECTORS, 0);
      std::vector< std::vector<DistinguishedPoint> > points_to_send(Configs::NUM_COLLECTORS);

// Go through the found distinguished points and bucket them according to their collector
      std::vector<DistinguishedPoint>::iterator it;
      for (it = aggregated_dps.begin(); it != aggregated_dps.end(); it++) {
        if ((*it).is_empty()) { // Ignore empty points
          continue;
        } else {
          int collector_id = (*it).current_hash % Configs::NUM_COLLECTORS;   // Determine the collector
          counts_per_collector[collector_id] += 1;   // Update count
          points_to_send[collector_id].push_back(*it); // Add dp to list
        }
      } // Finished parsing points // Send the data to the head collector, which will broadcast it to the rest
      world.send(Configs::HEAD_COLLECTOR, INCOMING_DP_TAG, counts_per_collector);
      world.send(Configs::HEAD_COLLECTOR, FOUND_DP_TAG, points_to_send);
    }

// If we've reached the end of this function or subset
    if (num_trails_this_processor >= max_trails_per_processor) {
      num_trails_this_processor = 0; // Reset count to 0

// If it's odd, we should change the subset ID.
      if (Configs::DEPTH % 2 == 1) {
        if (subset_id < num_subsets - 1) {  // Increment the subset
          subset_id++;
        } else {   // If we just did the last subset, increment the function
          func_id++;
          subset_id = 0;
        }
      } else { // Even depth, just increment the function index
        func_id++;
      }

// Update the empty DP
      std::vector< std::vector<DistinguishedPoint> >::iterator it;
      for (it = empty_dp_vec.begin(); it != empty_dp_vec.end(); it++) {
        ((*it)[0]).func_id = func_id;
```

```
      ((*it)[0]).subset_id = subset_id;
    }

// Tell processor 0 to dump it's map and create a new one
    // because we're starting a new function
    if (rank == Configs::HEAD_WORKER) {
      world.send(Configs::HEAD_COLLECTOR, INCOMING_DP_TAG, collector_dump_notify);
      world.send(Configs::HEAD_COLLECTOR, FOUND_DP_TAG, empty_dp_vec);
    }
   } // End "end of function/subset"
  } // End while claw has not been found loop
 } // End routine for Workers
} // end function mitm_mpi
```

```
/*------------------------------------------------------------------------
 * The software program comprising pQCS and related documentation provided below
 * (collectively, the "Software") are owned by Michele Mosca, including all
 * copyright and other intellectual property therein.
 *
 * The Software made available below may be used on a royalty-free basis solely
 * for non-commercial purposes of research and validation. No license, either
 * implied or explicit, is granted outside this limited field of use. The
 * Software and developments of the Software may not be redistributed or made
 * available through other channels, including Open Source libraries, without
 * the explicit agreement in writing of Michele Mosca. This Software is provided
 * on an "as is" basis and all representations and warranties, express or
 * implied, are disclaimed.
 *
 * You shall maintain all copyright attributions contained in the Software,
 * including in its source code, and provide full and complete attribution to
 * Michele Mosca for use of the Software in any resulting publication.
 *
 * Author: Olivia Di Matteo, 2015
 * Institute for Quantum Computing, Quantum Circuits Group
 *------------------------------------------------------------------------*/ include "mitmbox.h"

include <boost/dynamic_bitset.hpp>
include <boost/shared_ptr.hpp> include <cstdlib>
include <cstring>
include <string>
#include <cmath>
#include <vector>
#include <bitset>
#include <cstdlib>
#include <sstream>
#include <algorithm>
include <limits> include "circuit.h"
include "channel_rep.h"
include "rmatrix.h"
#include "ringzi.h"
#include "hashing.h"

using namespace std;

/** Initialize an empty MITMBox. All integers are
    set to 0, all matrices are empty, and all string
    parameters are set to the empty string. Not much
    to see here.
*/
MITMBox::MITMBox() {
  x0_ = current_hash_ = 0;
  first_function_ = "";
  next_function_string_ = "";
  current_hash_string_ = "";
  last_function_ = next_function_ = -1;
  d_ = 0;
  is_distinguished_ = false;
  full_depth_ = left_depth_ = right_depth_ = 0;

func_id_ = -1;
  subset_id_ = -1;

paulis_ = std::vector<std::vector<std::string>> ();
  coset_label_ = new ChannelRep();
```

```cpp
  current_matrix_product_ = new ChannelRep();
} // End default constructor /** Initialize a MITMBox ready for action.
    @param func_id The ID of the reduction function the trail should use
    @param subset_id For odd depths, the index of the subset of the larger space
    @param first_hash The initial, randomly chosen starting half.
    @param first_function Flag indicating whether we should do f1 or f2 first
    @param full_depth The *full* T count of the circuit we want to simulate.
    @param circuit The ChannelRep of the circuit we want to simulate
*/
MITMBox::MITMBox(int func_id, int subset_id, unsigned long long first_hash,
                 string first_function, int full_depth, ChannelRep circuit) {
  current_hash_ = first_hash;    // Set the hashes
  first_function_ = first_function;  // Set first function
  func_id_ = func_id;  // Set the thread ID
  d_ = 0;  // Starting at 0 steps of course
  is_distinguished_ = false;  // Not a distinguished point by default.

// Initialize the depths
  full_depth_ = full_depth;
  if (full_depth_ % 2 == 0) {
    left_depth_ = full_depth_ >> 1;
    right_depth_ = left_depth_;
    subset_id_ = -1;
  } else {
    left_depth_ = (full_depth_ >> 1) + 1;
    right_depth_ = (full_depth_ >> 1);
    subset_id_ = subset_id;
  }

// Initialize the channel rep matrices
  paulis_ = std::vector<std::vector<std::string> > ();
  coset_label_ = new ChannelRep(pow(2, Configs::NUM_QUBITS));
  current_matrix_product_ = new ChannelRep(pow(2, Configs::NUM_QUBITS));
  desired_crep_ = circuit;

// Determine the first function to use
  last_function_ = -1;  // First step, so no need to set anything
  next_function_string_ = first_function_;
  which_function_next();

// Do everything for right depth - left depth hash will be taken
  // care of in the appropriate functions // Generate the bit string using a dynamic bitset
  boost::dynamic_bitset<> initial_hash_bits(Configs::BASE_NUM_HASH_BITS*right_depth_,
                                            current_hash_);
  boost::to_string(initial_hash_bits, current_hash_string_);

// Use a standard unsigned long long bitset to convert that
    // string into an actual unsigned long long. Need to use C++11
    // std::bitset because Boost libraries don't have a function to
    // do this (yet).
    std::bitset<std::numeric_limits<unsigned long long>::digits>
        unsigned_long_hash_bits(current_hash_string_);
    x0_ = current_hash_ = unsigned_long_hash_bits.to_ullong();

if (Configs::DEBUG) {
      cout << "Initial hash string " << current_hash_string_ << endl;
      cout << "Hash value is " << current_hash_ << endl;
      cout << "Doing function " << atoi(next_function_string_.c_str()) + 1
           << " first" << endl;
      cout << endl;
    }
```

} // End constructor

/** Slightly more basic initialization of a MITMBox. Take the hash
    as a binary string and derive the first function from it.
    Used only really for testing purposes.
    @param func_id The ID of the reduction function the trail should use
    @param subset_id For odd depths, the index of the subset of the larger space
    @param hash_string A string of bits representing the starting point
    @param full_depth The *full* T count of the circuit we want to simulate.
    @param circuit The ChannelRep of the circuit we want to simulate
*/
MITMBox::MITMBox(int func_id, int subset_id, string hash_string,
                 int full_depth, ChannelRep circuit) {
  d_ = 0;
  is_distinguished_ = false;
  func_id_ = func_id;
  subset_id_ = subset_id;

// Initialize the depths
  full_depth_ = full_depth;
  if (full_depth_ % 2 == 0) {
    left_depth_ = full_depth_ >> 1;
    right_depth_ = left_depth_;
  } else {
    left_depth_ = (full_depth_ >> 1) + 1;
    right_depth_ = (full_depth_ >> 1);
  }

// Initialize the channel rep matrices
  paulis_ = std::vector<std::vector<std::string> > ();
  coset_label_ = new ChannelRep(pow(2, Configs::NUM_QUBITS));
  current_matrix_product_ = new ChannelRep(pow(2, Configs::NUM_QUBITS));
  desired_crep_ = circuit;

// Determine the first function to use based on this hash
  last_function_ = 0;
  next_function_string_ = hash_string.substr(0, 1);
  which_function_next();

current_hash_string_ = hash_string.substr(1, hash_string.length() - 1);

std::bitset<std::numeric_limits<unsigned long long>::digits>
           unsigned_long_hash_bits(current_hash_string_);
  current_hash_ = unsigned_long_hash_bits.to_ullong();

if (Configs::DEBUG) {
    cout << "Real initial hash value " << x0_ << endl;
    cout << "Initial hash string " << current_hash_string_ << endl;
    cout << "Doing function " << atoi(next_function_string_.c_str()) + 1
         << " first" << endl;
  }
} // End constructor /** Default destructor. Clear out the pointers to
    ChannelReps that we made so memory doesn't leak.
    Turns out this was super important.
*/
MITMBox::~MITMBox() {
  delete coset_label_;
  delete current_matrix_product_;
}

/** Check if the current hash value is a distinguished point, and
    set is_distinguished flag to true if it is.

```
*/
void MITMBox::check_distinguished() {
  if (current_hash_string_.find(Configs::DISTINGUISHED_STRING) == 0)
    is_distinguished_ = true;
} // End function check_distinguished /** Determine whether we should do f1 or f2 next, using the
    next_function_string_ variable. Sets next_function_.
*/
void MITMBox::which_function_next() {
  last_function_ = next_function_;
  if (next_function_string_ == "0")
    next_function_ = 1;
  else
    next_function_ = 2;
} // End function which_function_next /** Computes the LHS of the MITM T-count equation, R(Q_k) ... R(Q_1).
    The R(Q) are created and multiplied together.
    @param depth The depth we need (usually full_depth_ / 2
              or full_depth_ / 2 + 1).
*/
void MITMBox::f1(int depth) {
  size_t i;

paulis_.clear();

generate_pauli_sequence(depth);  // Produce an acceptable sequence of Paulis if (paulis_.empty())  // Something went wrong :(
    return;

// Multiply through all the paulis
  ChannelRep *temp_product = new ChannelRep(paulis_[0]);

for (i = 1; i < paulis_.size(); i++) {
    ChannelRep next_matrix(paulis_[i]);
    (*temp_product).mult_by_r_q(next_matrix);
  }

// Update the matrix product and peace out.
  *(current_matrix_product_) = *temp_product;
  delete temp_product;
} // End function f1

/** Computes the RHS of the MITM T-count equation,
    R(Q_k+1) ... R(Q_T_U) U. f2 calls f1 to do most of the work,
    and then takes the adjoint and multiplies on the right by
    the circuit matrix at the end.
    @param depth The depth we need (full_depth_/2).
*/
void MITMBox::f2(int depth) {
  f1(depth);  // Do f1
  current_matrix_product_->adj();  // Transpose
  *current_matrix_product_ *= desired_crep_;  // Multiply by the circuit
} // End function f2

/** Runs either MITMBox::f1() or MITMBox::f2() depending on the
    current value of next_function_. It then computes the coset label
    of the resulting matrix products, and a new hash value to use in t
    the next step. It also updates the value of next_function_ based on
    the hash it just computed, using the reduction function.
*/
```

```
void MITMBox::g() {
  if (Configs::DEBUG)
    cout << "Entered function g";

// Collect the old parameters - this is to make sure we don't
  // repeatedly hash to the same thing.
  unsigned long long old_hash = current_hash_;
  int old_function = next_function_;

// Run either f1 or f2 at the required depth
  if (Configs::DEBUG) {
    cout << "Using hash " << current_hash_ << " to do function "
         << next_function_ << endl;
  } if (next_function_ == 1)
    f1(left_depth_);
  else
    f2(right_depth_);

if (paulis_.empty())
    return;

// Compute the coset label
  *coset_label_ = current_matrix_product_->coset_label();

// Get the hex value of the hash
  string hash_string = (*coset_label_).get_sha_hash_hex();

// Print it if we want debugging info
  if (Configs::DEBUG)
    cout << "Hash string is " << hash_string << endl;

// Use the reduction function to compute values for next trial
  string start_hash_string = hash_string.substr(0, hash_string.length() / 4);
  unsigned long long first_hex_bit = ::reduction(start_hash_string,
                                                 func_id_, 2);

if (first_hex_bit == 0)
    next_function_string_ = "0";
  else
    next_function_string_ = "1";

// Determine which function to do next
  which_function_next();

// Grab the rest of the hash string
  string remaining_hash_string = hash_string.substr(hash_string.length() / 4,
                                                    hash_string.length());

// Get the modulus to send to the reduction function (size of the space)
  int num_hash_bits = Configs::BASE_NUM_HASH_BITS * right_depth_;
  // Be careful of things overflowing
  unsigned long long half_modulus = pow(2, num_hash_bits / 2);
  unsigned long long modulus = half_modulus * half_modulus;

// Reduce ALL the bits! Send the func_id_ as a the indicator of the
  // reduction function.
  unsigned long long reduced_hash = ::reduction(remaining_hash_string,
                                                func_id_, modulus);

if (Configs::DEBUG)
     cout << "Reduced hash is " << reduced_hash << endl;

// Get the bit set
  boost::dynamic_bitset<> hash_bits(num_hash_bits, reduced_hash);
  boost::to_string(hash_bits, current_hash_string_);
```

```cpp
    // Set the updated values
    std::bitset<std::numeric_limits<unsigned long long>::digits>
                unsigned_long_hash_bits(current_hash_string_);
    current_hash_ = unsigned_long_hash_bits.to_ullong();

// Check if it hashed to itself
    if (current_hash_ == old_hash && next_function_ == old_function) {
      if (Configs::DEBUG)
         cout << "Value hashed to itself :'(. Telling trail to terminate." << endl;
      // If it did, set the distance to a negative number so we'll still
      // know the trail length and also
      // that it hashed to itself rather than normally maxing out.
      d_ *= -1;
    } if (Configs::DEBUG) {
      cout << "Current hash is " << current_hash_ << endl;
      cout << "Current hash string is  " << current_hash_string_ << endl;
      cout << "Function " << next_function_ << " is next." << endl;
    }
} // End function g /** The 'overlord', or master function in claw finding.  This is the
    function which actually generates the trails.
    Calls MITMBox::g() repeatedly and increments the length of the trail, d_.
    After each iteration of MITMBox::g(), we check if the current_hash_
    is distinguished, and terminate or continue according to the result.
    @return A distinguished point which is full if we found one, or empty
            if we exceeded the maximum number of iterations specified.
*/
DistinguishedPoint MITMBox::f() {
    if (Configs::DEBUG) {
        cout << "Entered function f" << endl;
        cout << "d = " << d_ << endl;
    }

DistinguishedPoint empty_dp;

// Run g until a distinguished point is found, and return it
    while (d_ < static_cast<long long>(Configs::MAX_ITER)) {
      g();

if (paulis_.empty()) {
        d_ = -1;
        return empty_dp;
      }

// If d_ is positive this is good, so let's increment
      // If d_ is negative, that means it hashed to itself so don't touch it
      if (d_ >= 0)
         d_++;

check_distinguished();  // Distinguished point checking
      if (is_distinguished_) {
        if (Configs::DEBUG)
           cout << endl;
        // If we have a distinguished point that hashes to itself,
        // change the number of steps back to a positive number
        if (d_ < 0)
           d_ *= -1;
        if (Configs::DEBUG)
           cout << endl;
        //return new DistinguishedPoint(x0_, (first_function_.c_str())[0],
```

```cpp
    //                      current_hash_, d_, func_id_, subset_id_);
    DistinguishedPoint result(x0_, (first_function_.c_str())[0],
                        current_hash_, d_, func_id_, subset_id_);
      return result;
    } else if (d_ < 0) {
    // If it's not distinguished and the value is less than 0,
    // just send back an empty box because we're going nowhere.
      //return new DistinguishedPoint();
      return empty_dp;
    }

// Reset the vectors and update the number of steps
    paulis_.clear();
  } // End while if (Configs::DEBUG) {
    cout << "Exceeded maximum iteration limit " << endl;
    cout << endl;
  }

// If d_ exceeded MAX_ITER, return an empty dp
  return empty_dp;
} // End function f /** Does a single step of the trail. To be used in the
    find_claw method only!!
*/
void MITMBox::f_single() {
  paulis_.clear();
  g();
    d_++;
} // End function f_single /** Print out the Paulis in sequential order.
*/
void MITMBox::print_paulis() const {
  std::vector< std::vector<std::string> >::const_iterator it_depth;
  std::vector< std::string >::const_iterator it_qubits;

for (it_depth = paulis_.begin(); it_depth != paulis_.end(); it_depth++) {
    for (it_qubits = it_depth->begin(); it_qubits != it_depth->end(); it_qubits++) {
      cout << *it_qubits << "\t";
    } // End loop over each qubits
    cout << endl;
  } // End loop over each line of depth
} // End function print_paulis /** Produces a "good" sequence of Paulis, where "good"
    is as defined in the "Sneaky tricks" chapter of my thesis.
    These are stored within the MITMBox and not returned.
    @param depth The length of the Pauli chain to generate.
*/
void MITMBox::generate_pauli_sequence(int depth) {
  int i;
  size_t marker = 0;
  bool abort = false;   // Make sure nothing goes wrong paulis_.reserve(depth);

// Determine the bit string of Paulis
  string pauli_bit_string;
  stringstream identity_pauli_string;

for (i = 0; i < Configs::NUM_QUBITS; i++)
```

```cpp
    identity_pauli_string << "00";

// Do everything with proper subsetting
if (depth == left_depth_ && left_depth_ != right_depth_) {
  // If we need to do the left side in odd case
  unsigned long long subset_hash = current_hash_ +
                    (1 << 2*Configs::NUM_QUBITS*right_depth_) * (subset_id_);
  boost::dynamic_bitset<> subset_hash_bits(Configs::BASE_NUM_HASH_BITS * left_depth_,
                                           subset_hash);
  boost::to_string(subset_hash_bits, pauli_bit_string);

if (Configs::DEBUG) {
    cout << "Using subset " << subset_id_ + 1 << " so hash bits are "
         << pauli_bit_string << " and hash is " << subset_hash << endl;
  }
} else {
  pauli_bit_string = current_hash_string_;
} while (static_cast<int>(paulis_.size()) < depth) {
  // Flag for whether or not we should add this Pauli after checking stuff
  bool add_pauli = true;

// If we ran out of bits, hash again and append
  if (marker >= pauli_bit_string.length()) {
    string more_pauli_bits = sha_hash_bin(pauli_bit_string);

// Sometimes the hash doesn't work for some reason. Abort if it does.
    if (more_pauli_bits.length() == 0) {
      abort = true;
      cout << "Hash went wrong, terminating trail :(" << endl;
      break;
    }

// Make sure there are no extra bits that we can't use
    int extra_bits = more_pauli_bits.length() % (2 * Configs::NUM_QUBITS);
    if (extra_bits != 0)
      more_pauli_bits =
          more_pauli_bits.substr(0, more_pauli_bits.length() - extra_bits);

pauli_bit_string = pauli_bit_string + more_pauli_bits;
    if (Configs::DEBUG) {
      cout << "Ran out of bits, had to rehash " << endl;
      cout << "Adding more bits: " << more_pauli_bits << endl;
      cout << "Bit string is now " << pauli_bit_string << endl;
    }
  }

// Get bit string
  string pauli_bits = pauli_bit_string.substr(marker, 2*Configs::NUM_QUBITS);

if (Configs::DEBUG)
    cout << "Pauli bits are " << pauli_bits << endl;

if (pauli_bits == identity_pauli_string.str()) {
    if (Configs::DEBUG)
      cout << "Can't add the identity!" << endl;
    marker += 2*Configs::NUM_QUBITS;  // If it's the identity, increment and move on
  } else if (paulis_.empty()) {  // If it's the first one, just add it
    if (Configs::DEBUG)
      cout << "Adding the first pauli." << endl;
    std::vector<std::string> next_pauli = binary_symplectic_expander(pauli_bits);
    paulis_.push_back(next_pauli);
    marker += 2*Configs::NUM_QUBITS;
  } else {
    std::vector<std::string> next_pauli = binary_symplectic_expander(pauli_bits);
    if (Configs::DEBUG)
```

```cpp
      cout << "Adding additional pauli." << endl;

int barrier;

// Traverse list in reverse 'til we find something that doesn't commute
      for (barrier = paulis_.size() - 1; barrier >= 0; barrier--) {
        if (!ChannelRep::pauli_commute(paulis_[barrier], next_pauli)) {
          if (Configs::DEBUG)
            cout << "Pauli at position " << barrier
                 << " does not commute" << endl;
          break;
        }
        if (Configs::DEBUG)
          cout << "Pauli " << barrier << " commutes." << endl;
      } for ( ; barrier < paulis_.size(); barrier++) {
      //for ( ; barrier < static_cast<int>(paulis_.size()); barrier++) {
        if (paulis_[barrier] == next_pauli) {
          if (Configs::DEBUG)
            cout << "Can't add pauli " << pauli_bits
                 << ", already in the sequence!" << endl;
          add_pauli = false;
        }
      } if (add_pauli) {
        if (Configs::DEBUG)
          cout << "Adding pauli " << pauli_bits << " to the sequence." << endl;
        paulis_.push_back(next_pauli);
      } marker += 2*Configs::NUM_QUBITS;
    }
  } // End while the size is less than the depth if (abort)
    paulis_.clear();
} // End function generate_pauli_sequence /** Convert a string in binary symplectic representation of
    Paulis in a vector. Note that I do the conversion differently
    than the standard way, for simplicity. Ie, I ignore the middle "bar"
    and simply take two adjacent bits at a time from the string and
    convert them into a Pauli.
    @param bit_string A binary string, waiting to become Paulis
    @return A single-qubit vector of Paulis
*/
std::vector<std::string> binary_symplectic_expander(string bit_string) {
    size_t i;
  std::vector<std::string> pauli_vector;
  pauli_vector.reserve(bit_string.length() / 2);

for (i = 0; i < bit_string.length(); i += 2) {
      string pauli_bits = bit_string.substr(i, 2);

if (pauli_bits == "00")
        pauli_vector.push_back("I");
      else if (pauli_bits == "01")
        pauli_vector.push_back("X");
      else if (pauli_bits == "10")
        pauli_vector.push_back("Z");
      else
        pauli_vector.push_back("Y");
  }
  return pauli_vector;
} // End function binary_symplectic_expander
```

```
/*-------------------------------------------------------------------------
 * The software program comprising pQCS and related documentation provided below
 * (collectively, the "Software") are owned by Michele Mosca, including all
 * copyright and other intellectual property therein.
 *
 * The Software made available below may be used on a royalty-free basis solely
 * for non-commercial purposes of research and validation. No license, either
 * implied or explicit, is granted outside this limited field of use. The
 * Software and developments of the Software may not be redistributed or made
 * available through other channels, including Open Source libraries, without
 * the explicit agreement in writing of Michele Mosca. This Software is provided
 * on an "as is" basis and all representations and warranties, express or
 * implied, are disclaimed.
 *
 * You shall maintain all copyright attributions contained in the Software,
 * including in its source code, and provide full and complete attribution to
 * Michele Mosca for use of the Software in any resulting publication.
 *
 * Author: Olivia Di Matteo, 2015
 * Institute for Quantum Computing, Quantum Circuits Group
 *------------------------------------------------------------------------*/ include "channel_rep.h"

include <boost/dynamic_bitset.hpp>
#include <complex>
#include <cmath>
#include <cassert>
#include <string>
#include <vector>
include <algorithm> include "hashing.h"
include "rmatrix.h"
#include "mitmbox.h"
#include "configs.h"

using namespace std;

class RMatrix;

/** Default constructor. Initialize an empty ChannelRep with
    dimension 0 and all empty vectors.
*/
ChannelRep::ChannelRep() {
  dim_ = 0;
  col_mat_ = std::vector<RingRt2> ();
  element_locations_ = std::vector< std::vector<int> > ();
}

/** Initialize an empty ChannelRep but with specified size.
    @param dim the dimension of the ChannelRep matrix, i.e. dim x dim.
*/
ChannelRep::ChannelRep(int dim) {
  dim_ = dim;
  col_mat_ = std::vector<RingRt2> ();
  col_mat_.reserve(dim_*dim_);
  element_locations_ = std::vector< std::vector<int> > ();
}

/** Initialize a ChannelRep with specified size and contents.
    @param dim the dimension of the ChannelRep matrix
    @param col_vec a column vector with the contents of the matrix
*/
ChannelRep::ChannelRep(int dim, std::vector<RingRt2> col_vec) {
```

```
  dim_ = dim;
  col_mat_ = col_vec;
  element_locations_ = std::vector< std::vector<int> > ();
}

/** Initialize a ChannelRep from a previously existing one.
    @param M A ChannelRep we wish to copy
*/
ChannelRep::ChannelRep(const ChannelRep & M) {
  dim_ = M.dim_;
  col_mat_ = M.col_mat_;
  element_locations_ = M.element_locations_;
}

/** Initialize a ChannelRep from a vector of Paulis, i.e. the channel
    representation of R(Q_k) ... R(Q_1).
    @param paulis A vector of characters representing single qubit Paulis.
*/
ChannelRep::ChannelRep(std::vector<std::string> paulis) {
  int n_qbits = paulis.size();  // Make the size arbitrary,
                                // not necessarily global Configs::NUM_QUBITS
  int pauli_string_length = n_qbits << 1;
  dim_ = pow(pow(2, n_qbits), 2);
  col_mat_.reserve(dim_*dim_);  // Reserve space for the vector
                                // so allocation is faster // There are four possible entries in the ChannelRep of a Pauli
  RingRt2 r0(0, 0, 0);    // 0
  RingRt2 r1(1, 0, 0);    // 1
  RingRt2 rp(1, 0, 1);    // 1/sqrt(2)
  RingRt2 rn(-1, 0, 1);   // -1/sqrt(2)

int r, s;  // Entries of the channel representation of R(Q) are R(Q)_rs

// Cycle through all the possible Paulis from 0 to N^2
  // Iterate over columns first
  for (s = 0; s < dim_; s++) {
    // Get the next pauli and turn it into a bit string
    boost::dynamic_bitset<> sbits(pauli_string_length, s);
    std::string s_bit_string;
    boost::to_string(sbits, s_bit_string);

// Get the Pauli character sequence
    std::vector<std::string> s_paulis = binary_symplectic_expander(s_bit_string);

// Build the channel representation column by column
    // Also build the vector of element locations to be used
    // in sparse-style matrix multiplication.
    if (ChannelRep::pauli_commute(paulis, s_paulis)) {
      // If the Paulis commute, column s is just all 0s with a 1 on the diagonal
      int i;
      for (i = 0; i < dim_; i++) {
        if (i == s)
          col_mat_.push_back(r1);
        else
          col_mat_.push_back(r0);
      }

// Since just a diagonal, the next location vector has just one element
      std::vector<int> el_locs(1, s);
      element_locations_.push_back(el_locs);
    } else {
      // If the Paulis don't commute, the result is either
      // 1/sqrt(2) or -1/sqrt(2) depending on product of Paulis
      std::vector<int> el_locs;
```

```
    // For column s, iterate over all the rows
    for (r = 0; r < dim_; r++) {
      if (r == s) {
        // Non-commuting Paulis always have a +1/sqrt(2) term on the diagonal
        col_mat_.push_back(rp);
        el_locs.push_back(r);
      } else {
        // If it's not a diagonal term, we have to determine the sign
        // and if we should put anything there at all
        boost::dynamic_bitset<> rbits(pauli_string_length, r);
        std::string r_bit_string;
        boost::to_string(rbits, r_bit_string);
        std::vector<std::string> r_paulis = binary_symplectic_expander(r_bit_string);

// Check if our r Paulis and s Paulis multiply together to
        // form i or -i times the main Paulis
        int which_sign =
            ChannelRep::is_i_times_pauli(paulis, r_paulis, s_paulis);
        if (which_sign == 0) {
          col_mat_.push_back(r0);
        } else if (which_sign == 1) {
          col_mat_.push_back(rn);
          el_locs.push_back(r);
        } else {
          col_mat_.push_back(rp);
          el_locs.push_back(r);
        }
      }
    }  // End looping over rows element_locations_.push_back(el_locs);
  }  // End if Paulis don't commute
  }  // End loop over all columns
}  // End ChannelRep constructor from a vector of Pauli chars /** Initialize a ChannelRep by computing from scratch the channel representation
    of a unitary matrix. This is a time-consuming routine, but it generally only
    has to be done once per run of the program.
    @param R an RMatrix with elements in RingZI
*/
ChannelRep::ChannelRep(RMatrix &R) {
  dim_ = pow(pow(2, Configs::NUM_QUBITS), 2);  // Should be N^2 by N^2 (N = 2^n)
  col_mat_.reserve(dim_ * dim_);

// Loop over all Paulis. No tricks with commutation here this time.
  int r, s;
  int pauli_string_length = Configs::NUM_QUBITS << 1;  // Length of the strings we
                                                       // need for Paulis.
  int rmatrix_dim = 1 << Configs::NUM_QUBITS;

RMatrix Radj = R.adj();  // Grab the adjoint only once

RingZI prefactor(1, 0, 0, 0, pauli_string_length);  // 1/2^n

// The equation for the ChannelRep of an arbitrary matrix is
  //       R^hat_rs = 1/2^n Tr[P_r R P_s R^dag]

// Compute each element U^hat_rs
  for (s = 0; s < dim_; s++) {
    // Get the s Pauli RMatrix
    boost::dynamic_bitset<> sbits(pauli_string_length, s);
    std::string s_bit_string;
    boost::to_string(sbits, s_bit_string);

//char * s_paulis = new char[Configs::NUM_QUBITS];
```

```cpp
//std::vector<char*> s_paulis(Configs::NUM_QUBITS);

//binary_symplectic_expander(s_bit_string, s_paulis);
std::vector<std::string> s_paulis = binary_symplectic_expander(s_bit_string);

RMatrix Ps = Circuit::layer_to_matrix(s_paulis);

for (r = 0; r < dim_; r++) {
  // Get the r Pauli matrix
  boost::dynamic_bitset<> rbits(pauli_string_length, r);
  std::string r_bit_string;
  boost::to_string(rbits, r_bit_string);

//char* r_paulis = new char[Configs::NUM_QUBITS];

std::vector<std::string> r_paulis = binary_symplectic_expander(r_bit_string);

RMatrix Pr = Circuit::layer_to_matrix(r_paulis);

// Do the multiplication Pr.U.Ps.U^dag
  RMatrix mat_product(rmatrix_dim);
  mat_product = RMatrix::eye(rmatrix_dim);

mat_product *= Pr;
  mat_product *= R;
  mat_product *= Ps;
  mat_product *= Radj;

RingZI tr = mat_product.trace();   // Take the trace
  tr *= prefactor;   // Multiply by 1/2^n RingRt2 Uhat_rs(tr);
  col_mat_.push_back(Uhat_rs);

} // End loop over rows

} // End loop over columns
} // End constructor of ChannelRep from arbitrary unitary /** Default desctructor. Here to prevent memory leaks, nothing more.
*/
ChannelRep::~ChannelRep() {
}

/** Initialize an identity matrix as a ChannelRep.
    @param dim The dimension of the matrix (dim x dim).
    @return A ChannelRep with 1 as a RingRt2 element down the
            main diagonal.
*/
ChannelRep ChannelRep::identity(int dim) {
  int i, j;
  std::vector<RingRt2> matrix;
  matrix.reserve(dim * dim);

RingRt2 one(1, 0, 0);
  RingRt2 zero(0, 0, 0);

for (i = 0; i < dim; i++) {
    for (j = 0; j < dim; j++) {
      if (i == j)
        matrix.push_back(one);
      else
        matrix.push_back(zero);
    }
  }
```

```
  ChannelRep CR(dim, matrix);
  return CR;
} // End creation of Identity ChannelRep /** Initialize a ChannelRep with random entries.
    Mostly this will be used for testing purposes.
    @param dim The dimension of the matrix (dim x dim)
    @return A ChannelRep full of random RingRt2 values.
*/
ChannelRep ChannelRep::randCR(int dim) {
  int i, j;
  std::vector<RingRt2> matrix;
  matrix.reserve(dim * dim);

for (i = 0; i < dim; i++) {
    for (j = 0; j < dim; j++) {
      matrix.push_back(RingRt2::randRingRt2());
    }
  }

ChannelRep CR(dim, matrix);
  return CR;
} // End construction of random ChannelRep /** Overload the assignment operator. Set this ChannelRep
    to the ond provided as an argument.
    @param M A ChannelRep we wish to "copy" into this one.
*/
ChannelRep & ChannelRep::operator= (const ChannelRep & M) {
  dim_ = M.dim_;
  col_mat_ = M.col_mat_;
  return *this;
}

/** Add a ChannelRep to this one (standard matrix addition).
     @param M A ChannelRep
  */
ChannelRep & ChannelRep::operator+= (const ChannelRep & M) {
  int i;
  assert(dim_ == M.dim_);
  for (i = 0; i < dim_*dim_; i++) {
    col_mat_[i] += M.col_mat_[i];
    col_mat_[i].reduce();
  }
  return *this;
}

/** Subtract a ChannelRep from this one (standard matrix subtraction).
    @param M A ChannelRep
*/
ChannelRep & ChannelRep::operator-= (const ChannelRep & M) {
  int i;
  assert(dim_ == M.dim_);
  for (i = 0; i < dim_*dim_; i++) {
    col_mat_[i] -= M.col_mat_[i];
    col_mat_[i].reduce();
  }
  return *this;
}

/** Multiply all elements of this ChannelRep by a RingRt2 element.
```

```
    @param R Some of RingRt2
*/
ChannelRep & ChannelRep::operator*= (const RingRt2 & R) {
  int i;
  for (i = 0; i < dim_*dim_; i++) {
    col_mat_[i] *= R;
    col_mat_[i].reduce();
  }
  return *this;
}

/** Multiply on the right by another ChannelRep, and store the result
    in the current ChannelRep.
    @param M A ChannelRep to multiply by.
*/
ChannelRep & ChannelRep::operator*= (const ChannelRep & M) {
  int i, j, k;
  RingRt2 sum;
  assert(dim_ == M.dim_);

std::vector<RingRt2> new_mat;
  new_mat.reserve(dim_ * dim_);

for (i = 0; i < dim_; i++) {
    for (j = 0; j < dim_; j++) {
      sum = RingRt2(0, 0, 0);
      for (k = 0; k < dim_; k++) {
        sum += col_mat_[k*dim_ + j]*M.col_mat_[i*dim_ + k];
        sum.reduce();   // Always reduce or things will overflow!
      }
      new_mat.push_back(sum);
    }
  }
  col_mat_ = new_mat;
  return *this;
}

/** Multiply on the left by another ChannelRep and store
    it in the current matrix.
    @param M A ChannelRep to left multiply by
*/
ChannelRep & ChannelRep::left_multiply(const ChannelRep & M) {
  int i, j, k;
  RingRt2 sum;
  assert(dim_ == M.dim_);

std::vector<RingRt2> new_mat;
  new_mat.reserve(dim_ * dim_);

for (i = 0; i < dim_; i++) {
    for (j = 0; j < dim_; j++) {
      sum = RingRt2(0, 0, 0);
      for (k = 0; k < dim_; k++) {
        sum += M.col_mat_[k*dim_ + j]*col_mat_[i*dim_ + k];
        sum.reduce();
      }
      new_mat.push_back(sum);
    }
  }
  col_mat_ = new_mat;
  return *this;
}  // End function left_multiply /** Multiply on the left by a ChannelRep of the form R(Q). Store
``` the result in the current ChannelRep (it's a *= type multiplication).
    This is the "sparse" matrix multiplication routine, and should
    be used only for multiplication of the type previously listed.
    @param RQ A ChannelRep of the form R(Q) with Q a Pauli.
*/
ChannelRep & ChannelRep::mult_by_r_q(const ChannelRep &RQ) {
  std::vector< std::vector<int> > el_locs = RQ.element_locations_;

// Make sure our RQ actually has element locations and is of the correct type.
  assert(el_locs.empty() == false);

// Do the matrix multiplications
  int rq_row, this_col;

std::vector<RingRt2> new_mat;
  new_mat.reserve(dim_*dim_);

RingRt2 zero(0, 0, 0);

// Matrices are stored in column major order so make the column the main index
  // Loop over all columns of this matrix
  for (this_col = 0; this_col < dim_; this_col++) {
    for (rq_row = 0; rq_row < dim_; rq_row++) {   // Loop over all rows of R(Q)
      // Single element in the row (identity on diagonal)
      if (el_locs[rq_row].size() == 1) {
        int el_position = el_locs[rq_row][0];   // Get the position
        // Put the element in place (we know it was 1)
        new_mat.push_back(col_mat_[this_col * dim_ + el_position]);
      } else {   // Row has 2 elements in it
        int first = el_locs[rq_row][0];
        int second = el_locs[rq_row][1];

RingRt2 new_entry =
          col_mat_[this_col*dim_ + first] * RQ.col_mat_[first*dim_ + rq_row] +
          col_mat_[this_col*dim_ + second] * RQ.col_mat_[second*dim_ + rq_row];
        new_entry.reduce();
        new_mat.push_back(new_entry);
      }   // End multiplication
    }   // End looping over rows of R(Q)
  }   // End looping over all columns of this matrix col_mat_ = new_mat;
  return *this;
}   // End sparse matrix routine /** Define an order on ChannelReps by comparing the first element of each.
    @param M A ChannelRep with which we want to compare this one.
    @return True if this ChannelRep is less than M, false otherwise.
*/
bool ChannelRep::operator< (const ChannelRep & M) const {
  return col_mat_[0] < M.col_mat_[0];
}

/** Add a ChannelRep to this one,, keeping the original intact.
    @param M A ChannelRep
    @return A new ChannelRep that is the sum of this one and M.
*/
ChannelRep ChannelRep::operator+ (const ChannelRep & M) const {
  ChannelRep ret = *this;
  ret += M;
  return ret;
}
```

```
/** Subtract a ChannelRep from this one, keeping the original intact.
    @param M A ChannelRep
    @return A new ChannelRep that is the difference of this one and M.
*/
ChannelRep ChannelRep::operator- (const ChannelRep & M) const {
  ChannelRep ret = *this;
  ret -= M;
  return ret;
}

/** Scale an entire matrix by a RingRt2 element and keep the original
    ChannelRep intact.
    @param R An element of RingRt2.
    @return A new ChannelRep scaled by R.
*/
ChannelRep ChannelRep::operator* (const RingRt2 & R) const {
  ChannelRep ret = *this;
  ret *= R;
  return ret;
}

/** Multiply on the right by a ChannelRep and keep the original
    ChannelRep intact.
    @param M A ChannelRep
    @return A new ChannelRep that is the product (*this)*M.
*/
ChannelRep ChannelRep::operator* (const ChannelRep & M) const {
  ChannelRep ret = *this;
  ret *= M;
  return ret;
}

/** Check equality of two ChannelReps. Equality must hold for both
    the dimension and all the matrix contents.
    @param M A ChannelRep to compare to this one
    @return True if they are equal, false if not
*/
bool ChannelRep::operator== (const ChannelRep & M) const {
  if (dim_ != M.dim_)
    return false;

int i;
  for (i = 0; i < dim_*dim_; i++) {
    if (col_mat_[i] != M.col_mat_[i])
      return false;
  }
  return true;
}

/** Extract the element at position (i, j) in the matrix. Indices i and j
    use standard matrix indexing, e.g. U(1, 2) means the first row and
    second column.
    @param i Row index
    @param j Column index
    @return RingRt2 element at position (i, j)
*/
const RingRt2 & ChannelRep::operator() (int i, int j) const {
  if (col_mat_.empty()) {
    std::cout << "ERROR: unallocated matrix\n";
    exit(1);
  } return col_mat_[(j-1)*dim_ + i - 1];
```

}
```
/** Computes the trace of this ChannelRep.
    @return An element of RingRt2 which is the sum of all diagonal
            elements in this matrix.
*/
RingRt2 ChannelRep::trace() const {
  RingRt2 ret(0, 0, 0);
  int i;
  for (i = 0; i < dim_; i++)
    ret += col_mat_[i*dim_ + i];

ret.reduce();
  return ret;
} // End function trace

/** Turn this matrix into its adjoint. Since the ChannelRep
    elements are (should be) real, this is equivalent to taking the
    transpose.
*/
void ChannelRep::adj() {
  std::vector<RingRt2> new_cols;
  new_cols.reserve(dim_*dim_);

int i, j;

for (i = 0; i < dim_; i++) {
    for (j = 0; j < dim_; j++)
      // Note: no need to conjugate since all elements are real
      new_cols.push_back(col_mat_[j*dim_ + i]);
  } col_mat_ = new_cols;
} // End function adj

/** Set a provided ChannelRep as the adjoint of this matrix.
    This version of adj leaves the initial ChannelRep untouched.
    @param CR A ChannelRep
*/
void ChannelRep::adj(ChannelRep & CR) const {
  CR = *this;
  CR.adj();
} // End function adj /** Compute the sde of this matrix. The sde of a matrix is the
    maximum sde of all it's entries @see RingRt2::ring_sde() const.
    @return the sde.
*/
int ChannelRep::sde() const {
  int i, max = 0;
  for (i = 0; i < dim_*dim_; i++) {
    int entry_sde = col_mat_[i].ring_sde();
    if (entry_sde > max)
      max = entry_sde;
  }
  return max;
} // End function sde /** Scale the matrix so that all its entries have denominator sqrt(2)^sde,
    where the sde is that of the whole matrix (computed with ChannelRep::sde())
*/
void ChannelRep::scale_by_sde() {
  int i;
```

```
  int my_sde = this->sde();

for (i = 0; i < dim_*dim_; i++) {
    if (col_mat_[i].is_zero())
      continue;  // Only need to worry about non-zero entries
    col_mat_[i].scale_by_sde(my_sde);
  }
}  // End function scale_by_sde /** Sort the columns of this ChannelRep in lexicographical order.
    This is done by splitting the column vector into a vector of column
    vectors, and using std::sort from the C++ library.
    The comparison function is implemented in ChannelRep::col_compare().
*/
void ChannelRep::sort_columns() {
  std::vector< std::vector<RingRt2> > column_vectors;
  std::vector<RingRt2> temp_col;

int i, j;

column_vectors.reserve(dim_);

// Get a vector of vectors, one per column
  for (i = 0; i < dim_; i++) {
    temp_col.reserve(dim_);
    for (j = 0; j < dim_; j++)
      temp_col.push_back(col_mat_[i*dim_ + j]);
    column_vectors.push_back(temp_col);
    temp_col.clear();
  } std::sort(column_vectors.begin(), column_vectors.end(),
            ChannelRep::col_compare);
  col_mat_ = flatten(column_vectors);
}  // End function sort_columns /** Lexicographically compare two columns using std::lexicographical_compare().
    @param col1 The first column
    @param col2 The second column
    @return True if col1 < col2, false if col1 > col2.
*/
bool ChannelRep::col_compare(std::vector<RingRt2> col1,
                             std::vector<RingRt2> col2) {
  return std::lexicographical_compare(col1.begin(), col1.end(),
                                      col2.begin(), col2.end());
}  // End function col_compare /** Flatten a vector of column vectors into a single vector
    of stacked columns.
    @param column_vectors a vector of vectors
    @return the flattened vector
*/
std::vector<RingRt2> ChannelRep::flatten(std::vector< std::vector<RingRt2> >
                                                          column_vectors) {
  std::vector< std::vector<RingRt2> >::iterator it;
  std::vector<RingRt2>::iterator small_it;
  std::vector<RingRt2> col_mat;

for (it = column_vectors.begin(); it != column_vectors.end(); it++) {
    for (small_it = (*it).begin(); small_it != (*it).end(); small_it++)
      col_mat.push_back(*small_it);
  } return col_mat;
```

```
}  // End function flatten

/** Compute the coset label of this matrix. First, call
    ChannelRep::scale_by_sde(). Then, check each column
    and multiply the entire column by -1 if the first non-zero
    entry has a < 0, or a = 0 and b < 0 (checking is done by
    calling RingRt2::mult_by_m1() const). After this, order the columns
    lexicographically from left to right using ChannelRep::col_compare(),
    ChannelRep::sort_columns(), and standard sort from the C++ library.
    @return New ChannelRep initialized with the coset label of this ChannelRep
            as it's matrix.
 */
ChannelRep ChannelRep::coset_label() const {
  ChannelRep CL = *this;

CL.scale_by_sde();  // Scale it by the sde int col;

RingRt2 neg1(-1, 0, 0);

// Cycle through column by column (note the += m part)
  for (col = 0; col < dim_*dim_; col+=dim_) {
    int row;
    bool do_mult = false;
    bool first_entry = false;
    for (row = col; row < col+dim_; row++) {
      if (first_entry) {
        break;
      } else if (!do_mult) {
        if (CL.col_mat_[row].is_zero()) {
          continue;
        } else if (CL.col_mat_[row].mult_by_m1()) {
          CL.col_mat_[row] *= neg1;
          do_mult = true;
        } else {
          first_entry = true;
        }
      } else {
        CL.col_mat_[row] *= neg1;
      }
    }
  }  // End cycling through all columns // Permute the columns lexicographically
  CL.sort_columns();

return CL;
}  // End function coset_label

/** Produce a binary digest of all the elements in this ChannelRep matrix.
    Takes each RingRt2 element of the matrix, along with it's location, and
    produces a very long binary string which should be unique for this matrix.
    @return A binary string representing this ChannelRep which can be
            hashed by SHA-1 at a later point.
 */
std::string ChannelRep::hash_elements() const {
  stringstream hash_string;

int i;

// Since we will only be hashing ChannelReps which are already coset labels,
  // they are already scaled by the sde. If you are not hashing a coset label,
  // and instead just a normal ChannelRep, uncomment the following line:
  // scale_by_sde();
```

```cpp
  // Add the sde information to the stringstream
  long n = col_mat_[0].get_n();
  boost::dynamic_bitset<> n_bits(8, n);
  hash_string << n_bits;

for (i = 0; i < dim_*dim_; i++) {
      long a = col_mat_[i].get_a();
      long b = col_mat_[i].get_b();

boost::dynamic_bitset<> a_bits(8, a);
      boost::dynamic_bitset<> b_bits(8, b);

if (a < 0)
        hash_string << "1";
      else
        hash_string << "0";

hash_string << a_bits;

if (b < 0)
        hash_string << "1";
      else
        hash_string << "0";
      hash_string << b_bits;
  } return hash_string.str();
} // End function hash_elements

/** Get the SHA-1 hash of the coset label in hex
    @return String containing the hash of the coset label in hex,
            computed using the ChannelRep::hash_elements() routine.
*/
std::string ChannelRep::get_sha_hash_hex() const {
  std::string element_hash = hash_elements();
  std::string full_hash = ::sha_hash_hex(element_hash);
  return full_hash;
}

/** Get the SHA-1 hash of the coset label in binary
    @return String containing the hash of the ChannelRep in binary,
            computed using the ChannelRep::hash_elements() routine.
*/
std::string ChannelRep::get_sha_hash_bin() const {
  std::string element_hash = hash_elements();
  std::string full_hash = ::sha_hash_bin(element_hash);
  return full_hash;
}

/** Compute and return the hash of this ChannelRep.
    @param num_bits The number of bits in the returned hash.
    @return A binary string with length num_bits which is the hash of
            this ChannelRep.
*/
std::string ChannelRep::hash(int num_bits) const {
  // Get a hash digest using SHA of the current matrix
  std::string full_hash = get_sha_hash_bin();

// If our hash isn't long enough, hash it over and over again,
  // appending it until it is.
  while (static_cast<int>(full_hash.length()) < num_bits)
    full_hash = full_hash + ::sha_hash_bin(full_hash);
```

```cpp
    // Send back enough bits for the next matrix,
    // plus one extra bit to determine which function to do next
    std::string first_bit = full_hash.substr(0, 1);   // Get bit for the next function
    std::string pauli_bits = full_hash.substr(1, num_bits);  // Get bits for Paulis
    std::string complete_hash = first_bit + pauli_bits;   // Combine boost::dynamic_bitset<> final_hash_bits(complete_hash);
    std::string final_hash;
    to_string(final_hash_bits, final_hash);
    return final_hash;
}  // End function hash /** Print the matrix in standard form. A little tricky because it's
    stored in column major order.
*/
void ChannelRep::print() const {
    int i, j;
    for (i = 0; i < dim_; i++) {
      for (j = 0; j < dim_; j++) {
        col_mat_[j*dim_ + i].print();
        std::cout << "\t";
      }
      std::cout << std::endl;
    }
}  // End function print /** Print the element_locations_ vector. Can be used to
    see how we make use of the sparsity to store matrix elements.
*/
void ChannelRep::print_element_locations() const {
    size_t i, j;
    for (i = 0; i < element_locations_.size(); i++) {
      for (j = 0; j < element_locations_[i].size(); j++) {
        std::cout << element_locations_[i][j] << " ";
      }
      std::cout << std::endl;
    }
}  // End function print_element_locations /** Determine if two Pauli operators commute. Two strings of Paulis
    commute if the number of slots in which they differ is an even number. \n
    For example, the two Paulis \n
        I X Z Z Y X Z \n
        Z Z I I I X Y \n
    have 2 places (slot 1 and slot 6, indexing from 0) where they
    are different, *excluding differences with the identity*,
    so they commute since 2 is even. On the other hand, \n
        I X Z Z Y X Z \n
        Z X I I I X Y \n
    anti-commute because now there is only 1 different spot, and 1 is odd.

@param p1 a char vector of Paulis
    @param p2 another char vector of Paulis
    @return True if they commute, false if they do not (they anticommute)
*/
bool ChannelRep::pauli_commute(std::vector<std::string> p1, std::vector<std::string> p2) {
    size_t i;
    int num_diffs = 0;

assert(p1.size() == p2.size());

for (i = 0; i < p1.size(); i++) {
      if (p1[i] == "I" || p2[i] == "I")
```

```
        continue;
      if (p1[i] != p2[i])
        num_diffs++;
  } if (num_diffs % 2 == 0)
    return true;
  else
    return false;
}  // End function pauli_commute /** Determine if two Pauli operators commute by checking if the
    number of positions in which they differ non-trivially is even
    (commute) or odd (anti commute).
    @param p1 a binary symplectic string of Paulis
    @param p2 another binary symplectic string of Paulis
    @return True if they commute, false if they do not (they anticommute)
*/
bool ChannelRep::pauli_commute_strings(std::string p1, std::string p2) {
  size_t i;
  int num_diffs = 0;

assert(p1.length() == p2.length());

for (i = 0; i < p1.size(); i += 2) {
    std::string p1sub = p1.substr(i, i + 2);
    std::string p2sub = p2.substr(i, i + 2);
    if (p1sub == "00" || p2sub == "00")
      continue;
    if (p1sub != p2sub)
      num_diffs++;
  } if (num_diffs % 2 == 0)
    return true;
  else
    return false;
}  // End function pauli_commute_strings /** Determine whether a Pauli is i or -i times the product of two other Paulis.
    @param p The Pauli we want to compare the product of r and s to
    @param r A char vector of Paulis
    @param s Another char vector of Paulis
    @return True if p = irs or p = -irs, false if not.
*/
int ChannelRep::is_i_times_pauli(std::vector<std::string> p, std::vector<std::string> r,
                                  std::vector<std::string> s) {
  assert(r.size() == s.size());   // Make sure our vectors have the same length!
  assert(r.size() == p.size());

std::complex<double> sign(1, 0);
  std::complex<double> im(0, 1);
  std::complex<double> mim(0, -1);
  size_t i;

for (i = 0; i < p.size(); i++) {
    std::string product;

if (r[i] == "I") {   // Check identity, set product to the other one Pauli
      product = s[i];
      if (p[i] != product)
        return 0;   // If not the same, already return
    } else if (r[i] == "X") {   // First one is X
      if (s[i] == "I") {
        product = r[i];
```

```
      if (p[i] != product)
        return 0;
    } else if (s[i] == "X") {
      product = "I";
      if (p[i] != product )
        return 0;
    } else if (s[i] == "Y") {
      product = "Z";
      if (p[i] != product)
        return 0;
      else
        sign *= im;
    } else if (s[i] == "Z") {
      product = "Y";
      if (p[i] != product)
        return 0;
      else
        sign *= mim;
    }
  } else if (r[i] == "Y") {   // First one is Y
    if (s[i] == "I") {
      product = r[i];
      if (p[i] != product)
        return 0;
    } else if (s[i] == "X") {
      product = "Z";
      if (p[i] != product)
        return 0;
      else
        sign *= mim;
    } else if (s[i] == "Y") {
      product = "I";
      if (p[i] != product)
        return 0;
    } else if (s[i] == "Z") {
      product = "X";
      if (p[i] != product)
        return 0;
      else
        sign *= im;
    }
  } else if (r[i] == "Z") {   // First one is Z
    if (s[i] == "I") {
      product = r[i];
      if (p[i] != product)
        return 0;
    } else if (s[i] == "X") {
      product = "Y";
      if (p[i] != product)
        return 0;
      else
        sign *= im;
    } else if (s[i] == "Y") {
      product = "X";
      if (p[i] != product)
        return 0;
      else
        sign *= mim;
    } else if (s[i] == "Z") {
      product = "I";
      if (p[i] != product)
        return 0;
    }
  }
}  // End checking for loop if (std::real(sign) == 0 && std::imag(sign) == 1)
```

```
      return 1;
   else if (std::real(sign) == 0 && std::imag(sign) == -1)
      return -1;
   else
      return 0;
}  // End function pauli_commute
```

```
/*------------------------------------------------------------------------------
 * The software program comprising pQCS and related documentation provided below
 * (collectively, the "Software") are owned by Michele Mosca, including all
 * copyright and other intellectual property therein.
 *
 * The Software made available below may be used on a royalty-free basis solely
 * for non-commercial purposes of research and validation. No license, either
 * implied or explicit, is granted outside this limited field of use. The
 * Software and developments of the Software may not be redistributed or made
 * available through other channels, including Open Source libraries, without
 * the explicit agreement in writing of Michele Mosca. This Software is provided
 * on an "as is" basis and all representations and warranties, express or
 * implied, are disclaimed.
 *
 * You shall maintain all copyright attributions contained in the Software,
 * including in its source code, and provide full and complete attribution to
 * Michele Mosca for use of the Software in any resulting publication.
 *
 * Author: Olivia Di Matteo, 2015
 * Institute for Quantum Computing, Quantum Circuits Group
 *-----------------------------------------------------------------------------*/ include "./hashing.h"

include <openssl/sha.h>
include <cstdlib>
include <cassert>
include <cctype>
include <iostream>
include <sstream>
include <cstdlib>
include <locale>
include <cstring>
include <string>
include <iomanip> using namespace std;

// Binary values of 0 to f, for use when converting from hexadecimal to binary
const char* binaries[] = {"0000", "0001", "0010", "0011", "0100", "0101",
                          "0110", "0111", "1000", "1001", "1010", "1011",
                          "1100", "1101", "1110", "1111"};

// Get the XOR of two strings
std::string XOR(std::string s1, std::string s2) {
  std::string xored_string = "";
  assert(s1.length() == s2.length());  // Make sure they're the same length size_t i;
  for (i = 0; i < s1.length(); i++) {
    if (s1[i] == s2[i])
      xored_string = xored_string + "0";
    else
      xored_string = xored_string + "1";
  } return xored_string;
}

/** Get the hexadecimal representation of a SHA digest.
 *   @param my_string The string we put through SHA-1 previously
 *   @param length Length of SHA-1 digest (160 bits)
 *   @return Binary version of my_string
 */
std::string get_hex_rep(unsigned char* my_string, int length) {
    stringstream hex_rep;
```

```cpp
    hex_rep.fill('0');
    hex_rep << std::hex;    // Means it should be hex formatted
    int i;

for (i = 0; i < length; i++) {
        hex_rep << setw(2) << (unsigned int) my_string[i];
    }
    return hex_rep.str();
}

/** Get the binary representation of a SHA digest.
 *  Function converts the digest to hex, and then to binary
 *  @param my_string The string we put through SHA-1 previously
 *  @param length Length of SHA-1 digest (160 bits)
 *  @return Binary version of my_string
 */
std::string get_bin_rep(unsigned char* my_string, int length) {
    if (Configs::DEBUG) {
        cout << "In function get_bin_rep" << endl;
        cout << "Hex rep before conversion is " << my_string << endl;
    } std::string hex_rep = get_hex_rep(my_string, length);   // Get the hex rep
    int len = hex_rep.length();   // Length of hash string if (Configs::DEBUG) {
        cout << "Hex rep is " << hex_rep << endl;
        cout << "Length of hex rep is " << len << endl;
    } stringstream bin_rep;

int i;
    // For some reason, sometimes the converted hex string has an extra 'P'
    // at the end. Make sure it's a legit a-f character by checking the
    // difference.
    for (i = 0; i < len; i++) {
        // Use the ASCII table
        if (isdigit(hex_rep[i]))   // Check if it's between 0-9
            bin_rep << binaries[hex_rep[i] - 48];
        // If not, it's an alphabet character
        else if (hex_rep[i] - 87 >= 0 && hex_rep[i] - 87 < 6)
            bin_rep << binaries[hex_rep[i] - 87];
        else   // It's something else, this is bad, so let's move on.
            continue;
    } if (Configs::DEBUG)
        cout << "Binary rep is " << bin_rep.str() << endl;
    return bin_rep.str();
}

/** Get the hexadecimal representation of the SHA-1 hash of a given bit string
    This function actually calls the ssl SHA-1 methods.
    @param bit_string The string we want to hash
    @return A string of hex digits which are the SHA-1 hash of the input.
*/
std::string sha_hash_hex(std::string bit_string) {
    unsigned char hash[SHA_DIGEST_LENGTH];   // Holds the resultant hash
    const char* to_hash = bit_string.c_str();   // Convert our string to a C string // Do the SHA1 hash. Documentation is really sketchy for this part
    SHA_CTX ctx;   // SHA1 hash structure
    SHA1_Init(&ctx);
```

```cpp
  SHA1_Update(&ctx, to_hash, strlen(to_hash));  // This part does the hash (?)
  SHA1_Final(hash, &ctx);

/* Return the binary value of the hash */
  return std::string(get_hex_rep(hash, SHA_DIGEST_LENGTH));
}

/** Get the binary version of the SHA1 hash of a given bit string.
    Calls SSL method, turns it to hex and then binary.
    @param bit_string The string we want to hash
    @return A string of bits which are the SHA-1 hash of the input.
 */
std::string sha_hash_bin(std::string bit_string) {
  if (Configs::DEBUG)
    cout << "In function sha_hash_bin" << endl;
  unsigned char hash[SHA_DIGEST_LENGTH];    // Holds the resultant hash
  const char* to_hash = bit_string.c_str();  // Convert to a C string // Do the SHA1 hash. Documentation is really sketchy for this part
  SHA_CTX ctx;   // SHA1 hash structure
  SHA1_Init(&ctx);
  SHA1_Update(&ctx, to_hash, strlen(to_hash));  // This part does the hash (?)
  SHA1_Final(hash, &ctx);

return get_bin_rep(hash, SHA_DIGEST_LENGTH);
}

/** Compute the reduction of a hash value back into an integer,
 *  which will be made into a new matrix!
 *  @param hex_rep The hexadecimal representation of a value we hashed before.
 *  @param redfun The index of the reduction function we are using.
 *  @param modulus Size of the space we are modding in.
 *  @return A new unsigned int which will be used to make the next set of
            Paulis in the trail.
 */
unsigned long long reduction(const std::string hex_rep, int redfun,
                                     unsigned long long modulus) {
  unsigned long long running_sum = 0;

size_t i;
  for (i = 0; i < hex_rep.length(); i++) {
    unsigned long long next_num =
        strtol(hex_rep.substr(i, 1).c_str(), NULL, 16);  // Convert to a long
    running_sum += (next_num << i);
  } running_sum = running_sum >> redfun;
  return running_sum % modulus;
}
```

The invention claimed is:

1. A method for synthesizing quantum circuits, the method comprising:
performing one or more deterministic walks on a search space by, for each of multiple processors in parallel:
i. generating a starting point;
ii. mapping the starting point to a candidate matrix or a sequence of quantum gates;
iii. applying a deterministic function to the candidate matrix to generate a new point, referred to as a current point;
iv. if the current point is distinguished:
compare the current point to a database of existing distinguished points shared amongst the processors;
if the same distinguished point is not present in the database, it is added, then the processor returns to i;
if the same distinguished point is present in the database, the two corresponding walks are checked for a claw;
if a claw is found, the processor returns a solution;
if no claw is found, the processor discards or overwrites the existing distinguished point and returns to i;
v. if the current point is not distinguished, mapping the current point to a new candidate matrix and returning to iii;
performing a circuit synthesis according to results of the one or more deterministic walks; and
outputting a synthesized quantum circuit.

2. The method of claim 1, wherein the starting point for the one or more deterministic walks is chosen randomly.

3. The method of claim 1, further comprising determining a plurality of search spaces.

4. The method of claim 3, wherein there are two search spaces.

5. The method of claim 4, wherein the two spaces are of equal size.

6. The method of claim 1, wherein a meet in the middle algorithm is used.

7. The method of claim 1, wherein the parallel search comprises a mapping from unitary matrices to binary strings.

8. The method of claim 1, wherein the parallel search comprises a step of generating a list of distinguished points.

9. The method of claim 1, wherein the circuit synthesis comprises a step of finding a list of unitary matrices having a product within an error tolerance of a given value.

10. The method of claim 9, wherein the error tolerance is less than a machine precision value.

11. The method of claim 10, wherein the error tolerance is 0.

12. The method of claim 1, wherein the circuit synthesis uses a gate set.

13. The method of claim 12, wherein the gate set is universal.

14. The method of claim 1, wherein the deterministic walk comprises:
applying a hash function to the candidate matrix to generate the new point;
creating a distinguished point structure;
storing the distinguished point structure in the database; and
finding a merging of trails with matrices of two different types.

15. The method of claim 14, wherein a plurality of collectors, workers, and verifiers are used to perform the method.

16. The method of claim 15, wherein inter-processor communication is used.

17. A non-transitory computer readable medium comprising computer executable instructions for synthesizing quantum circuits, comprising instructions for:
performing one or more deterministic walks on a search space by, for each of multiple processors in parallel:
i. generating a starting point;
ii. mapping the starting point to a candidate matrix or a sequence of quantum gates;
iii. applying a deterministic function to the candidate matrix to generate a new point, referred to as a current point;
iv. if the current point is distinguished:
compare the current point to a database of existing distinguished points shared amongst the processors;
if the same distinguished point is not present in the database, it is added, then the processor returns to i;
if the same distinguished point is present in the database, the two corresponding walks are checked for a claw;
if a claw is found, the processor returns a solution;
if no claw is found, the processor discards or overwrites the existing distinguished point and returns to i;
v. if the current point is not distinguished, mapping the current point to a new candidate matrix and returning to iii;
performing a circuit synthesis according to results of the one or more deterministic walks; and
outputting a synthesized quantum circuit.

18. A quantum computing system comprising a processor and memory, the memory comprising computer executable instructions for synthesizing quantum circuits by:
performing one or more deterministic walks on a search space by, for each of multiple processors in parallel:
i. generating a starting point;
ii. mapping the starting point to a candidate matrix or a sequence of quantum gates;
iii. applying a deterministic function to the candidate matrix to generate a new point, referred to as a current point;
iv. if the current point is distinguished:
compare the current point to a database of existing distinguished points shared amongst the processors;
if the same distinguished point is not present in the database, it is added, then the processor returns to i;
if the same distinguished point is present in the database, the two corresponding walks are checked for a claw;
if a claw is found, the processor returns a solution;
if no claw is found, the processor discards or overwrites the existing distinguished point and returns to i;
v. if the current point is not distinguished, mapping the current point to a new candidate matrix and returning to iii;
performing a circuit synthesis according to results of the one or more deterministic walks; and
outputting a synthesized quantum circuit.

19. The system of claim 18, wherein the deterministic walk comprises:
- applying a hash function to the candidate matrix to generate the new point;
- creating a distinguished point structure;
- storing the distinguished point structure in the database; and
- finding a merging of trails with matrices of two different types.

\* \* \* \* \*